(12) United States Patent
Nandipati et al.

(10) Patent No.: US 11,756,227 B2
(45) Date of Patent: Sep. 12, 2023

(54) POSE CORRECTION FOR DIGITAL CONTENT

(71) Applicant: QUALCOMM Incorporated, San Diego, CA (US)

(72) Inventors: Srujan Babu Nandipati, Bangalore (IN); Pushkar Gorur Sheshagiri, Bengaluru (IN); Chiranjib Choudhuri, Bangalore (IN); Ajit Deepak Gupte, Bangalore (IN); Gerhard Reitmayr, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 17/307,920

(22) Filed: May 4, 2021

(65) Prior Publication Data

US 2022/0366597 A1    Nov. 17, 2022

(51) Int. Cl.
*G06T 7/73* (2017.01)
*G06T 7/20* (2017.01)
*G06T 7/33* (2017.01)
*G02B 27/01* (2006.01)

(52) U.S. Cl.
CPC ............ *G06T 7/73* (2017.01); *G02B 27/0172* (2013.01); *G06T 7/20* (2013.01); *G06T 7/33* (2017.01); *G02B 2027/014* (2013.01); *G02B 2027/0138* (2013.01)

(58) Field of Classification Search
CPC .... G06T 7/73; G06T 7/20; G06T 7/33; G02B 27/0172; G02B 2027/0138; G02B 2027/014
See application file for complete search history.

(56) References Cited

U.S. PATENT DOCUMENTS

| | | | | |
|---|---|---|---|---|
| 2015/0371440 A1* | 12/2015 | Pirchheim | ................. | G06T 7/73 345/419 |
| 2017/0003764 A1* | 1/2017 | Li | ........................ | G06F 3/04842 |
| 2018/0188032 A1* | 7/2018 | Ramanandan | .......... | G01S 19/49 |
| 2021/0142497 A1* | 5/2021 | Pugh | ......................... | G06T 7/55 |
| 2021/0174097 A1* | 6/2021 | Tsai | .......................... | G06T 7/70 |
| 2021/0256767 A1* | 8/2021 | Velasquez | ............ | G01C 21/387 |

* cited by examiner

*Primary Examiner* — Nay A Maung
*Assistant Examiner* — Vaisali Rao Koppolu
(74) *Attorney, Agent, or Firm* — QUALCOMM INCORPORATED

(57) ABSTRACT

Systems and techniques are provided for determining and applying corrected poses in digital content experiences. An example method can include receiving, from one or more sensors associated with an apparatus, inertial measurements and one or more frames of a scene; based on the one or more frames and the inertial measurements, determining, via a first filter, an angular and linear motion of the apparatus and a gravity vector indicating a direction of gravitational force interacting with the apparatus; when a motion of the apparatus is below a threshold, determining, via a second filter, an updated gravity vector indicating a direction of gravitational force interacting with the apparatus; determining, based on the updated gravity vector, parameters for aligning an axis of the scene with a gravity direction in a real-world spatial frame; and aligning, using the parameters, the axis of the scene with the gravity direction in the real-world spatial frame.

29 Claims, 10 Drawing Sheets

POSE CORRECTION FOR DIGITAL CONTENT

TECHNICAL FIELD

The present disclosure generally relates to image processing. For example, aspects of the present disclosure include systems and techniques for correcting and aligning estimated poses in digital content experiences.

BACKGROUND

Extended reality technologies can combine real environments from the physical world (e.g., the real world) and virtual environments or content to provide users with extended reality experiences. The extended reality experiences allow users to interact with a real or physical environment enhanced or augmented with virtual content and vice versa. More recently, extended reality technologies have been implemented to enhance user experiences in a wide range of contexts, such as healthcare, retail, education, social media, entertainment, and so forth. The term extended reality (XR) can encompass augmented reality (AR), virtual reality (VR), mixed reality (MR), and the like. Each of these forms of XR allows users to experience or interact with immersive virtual environments or content.

To provide realistic XR experiences, XR technologies generally aim to integrate virtual content with the physical world. This can involve generating a map of the real-world environment and calculating a particular point of view or pose relative to the map of the real-world environment in order to anchor virtual content to the real-world environment in a convincing manner. The point of view or pose information can be used to match virtual content with the user's perceived motion and the spatio-temporal state of the real-world environment. However, as the user with the XR device moves during the XR experience, the point of view or pose of the user (e.g., of the XR device) relative to the real-world environment changes. Such changes can cause virtual content presented during the XR experience to appear misaligned or out of sync with the user's perceived motion and the spatio-temporal state of the real-world environment.

BRIEF SUMMARY

In some examples, systems and techniques are described for correcting and aligning estimated poses in digital content experiences. According to at least one illustrative example, a method of determining corrected poses and applying pose corrections in digital content experiences is provided. In some examples, the method can include: receiving, from one or more sensors associated with a device, inertial measurements and one or more frames of a scene; determining, based on the one or more frames and the inertial measurements, an angular motion of the device, a linear motion of the device, and a gravity vector indicating a direction of a gravitational force interacting with the device; determining, based on a determination that a motion of the device is below a threshold, an updated gravity vector indicating an updated direction of the gravitational force interacting with the device; determining, based on the updated gravity vector, one or more alignment parameters for aligning an axis of the scene with a gravity direction in a real-world spatial frame, the gravity direction corresponding to the updated direction of the gravitational force interacting with the device; and aligning, using the one or more alignment parameters, the axis of the scene with the gravity direction in the real-world spatial frame.

According to at least one illustrative example, a non-transitory computer-readable medium is provided for determining corrected poses and applying pose corrections in digital content experiences. In some aspects, the non-transitory computer-readable medium can include instructions that, when executed by one or more processors, cause the one or more processors to: receive, from one or more sensors associated with a device, inertial measurements and one or more frames of a scene; determine, based on the one or more frames and the inertial measurements, an angular motion of the device, a linear motion of the device, and a gravity vector indicating a direction of a gravitational force interacting with the device; determine, based on a determination that a motion of the device is below a threshold, an updated gravity vector indicating an updated direction of the gravitational force interacting with the device; determine, based on the updated gravity vector, one or more alignment parameters for aligning an axis of the scene with a gravity direction in a real-world spatial frame, the gravity direction corresponding to the updated direction of the gravitational force interacting with the device; and align, using the one or more alignment parameters, the axis of the scene with the gravity direction in the real-world spatial frame.

According to at least one illustrative example, an apparatus is provided for determining corrected poses and applying pose corrections in digital content experiences. In some aspects, the apparatus can include memory having stored thereon computer-readable instructions and one or more processors configured to: receive, from one or more sensors associated with the apparatus, inertial measurements and one or more frames of a scene; determine, based on the one or more frames and the inertial measurements, an angular motion of the apparatus, a linear motion of the apparatus, and a gravity vector indicating a direction of a gravitational force interacting with the apparatus; determine, based on a determination that a motion of the apparatus is below a threshold, an updated gravity vector indicating an updated direction of the gravitational force interacting with the apparatus; determine, based on the updated gravity vector, one or more alignment parameters for aligning an axis of the scene with a gravity direction in a real-world spatial frame, the gravity direction corresponding to the updated direction of the gravitational force interacting with the apparatus; and align, using the one or more alignment parameters, the axis of the scene with the gravity direction in the real-world spatial frame.

According to another illustrative example, an apparatus for determining corrected poses and applying pose corrections in digital content experiences can include: means for receiving, from one or more sensors associated with the apparatus, inertial measurements and one or more frames of a scene; determining, based on the one or more frames and the inertial measurements, an angular motion of the apparatus, a linear motion of the apparatus, and a gravity vector indicating a direction of a gravitational force interacting with the apparatus; determining, based on a determination that a motion of the apparatus is below a threshold, an updated gravity vector indicating an updated direction of the gravitational force interacting with the apparatus; determining, based on the updated gravity vector, one or more alignment parameters for aligning an axis of the scene with a gravity direction in a real-world spatial frame, the gravity direction corresponding to the updated direction of the gravitational force interacting with the apparatus; and aligning, using the one or more alignment parameters, the axis of the scene with the gravity direction in the real-world spatial frame.

In some aspects, the method, non-transitory computer-readable medium, and apparatuses described above can generate SLAM maps of a plurality of scenes; store the SLAM maps and associated gravity vectors; and based on a determination that the apparatus has moved from a current scene associated with a first SLAM map of the SLAM maps to a different scene associated with a second SLAM map of the SLAM maps, initialize a gravity-aligned SLAM map using the second SLAM map and an associated gravity vector.

In some examples, the one or more alignment parameters can include one or more rotation parameters identifying a rotation of the scene from a current pose to a gravity-aligned pose, the gravity-aligned pose being aligned with the gravity direction in the real-world spatial frame.

In some examples, the one or more alignment parameters can include one or more translation parameters identifying a translation of the scene from a current pose to a gravity-aligned pose, the gravity-aligned pose being aligned with the gravity direction in the real-world spatial frame.

In examples, determining the one or more alignment parameters can include determining that a magnitude of an alignment correction associated with the one or more alignment parameters exceeds a threshold; and dividing the alignment correction into a plurality of incremental alignment corrections.

In some cases, aligning the axis of the scene with the gravity direction in the real-world spatial frame can include applying the plurality of incremental alignment corrections across a plurality of frames capturing the scene.

In some cases, applying the plurality of incremental alignment corrections across the plurality of frames can include applying an incremental alignment correction of the plurality of incremental alignment corrections to a current frame of the plurality of frames; and applying each additional incremental alignment correction in the plurality of incremental alignment corrections to a different respective frame from the plurality of frames.

In some cases, aligning the axis of the scene with the gravity direction in the real-world spatial frame can include determining, based on at least one of the angular motion of the apparatus and the linear motion of the apparatus, that a motion of the apparatus exceeds a threshold; and based on the motion of the apparatus exceeding the threshold, applying the plurality of incremental alignment corrections across a plurality of frames capturing the scene.

In some examples, dividing the alignment correction into the plurality of incremental alignment corrections can include determining a difference between the one or more alignment parameters and one or more additional alignment parameters previously used to align the axis of the scene with the gravity direction in the real-world spatial frame; and based on a determination that the difference between the one or more alignment parameters and the one or more additional alignment parameters exceeds a threshold, dividing the alignment correction into the plurality of incremental alignment corrections.

In some examples, the one or more alignment parameters can describe a rotation of at least one of the scene and one or more virtual content items rendered in the scene from a current pose to a gravity-aligned pose, the gravity-aligned pose being aligned with the gravity direction in the real-world spatial frame.

In some aspects, the method, non-transitory computer-readable medium, and apparatuses described above can generate a map of the scene, the map of the scene comprising a set of three-dimensional (3D) landmarks in the scene projected from the real-world spatial frame to frame coordinates; and store the map of the scene and the updated gravity vector associated with the scene.

In some examples, the map of the scene can include a simultaneous localization and mapping (SLAM) map.

In some aspects, the method, non-transitory computer-readable medium, and apparatuses described above can initiate a new extended reality session associated with the scene; based on the stored map of the scene and updated gravity vector, load an initial map of the scene for the new extended reality session; register the stored map of the scene to the initial map of the scene; and align, using the updated gravity vector, the registered map of the scene with the gravity direction in the real-world spatial frame.

In some aspects, the method, non-transitory computer-readable medium, and apparatuses described above can render one or more virtual content items in the scene, the one or more virtual content items being aligned with the gravity direction in the real-world spatial frame based on the aligning of the axis of the scene with the gravity direction.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
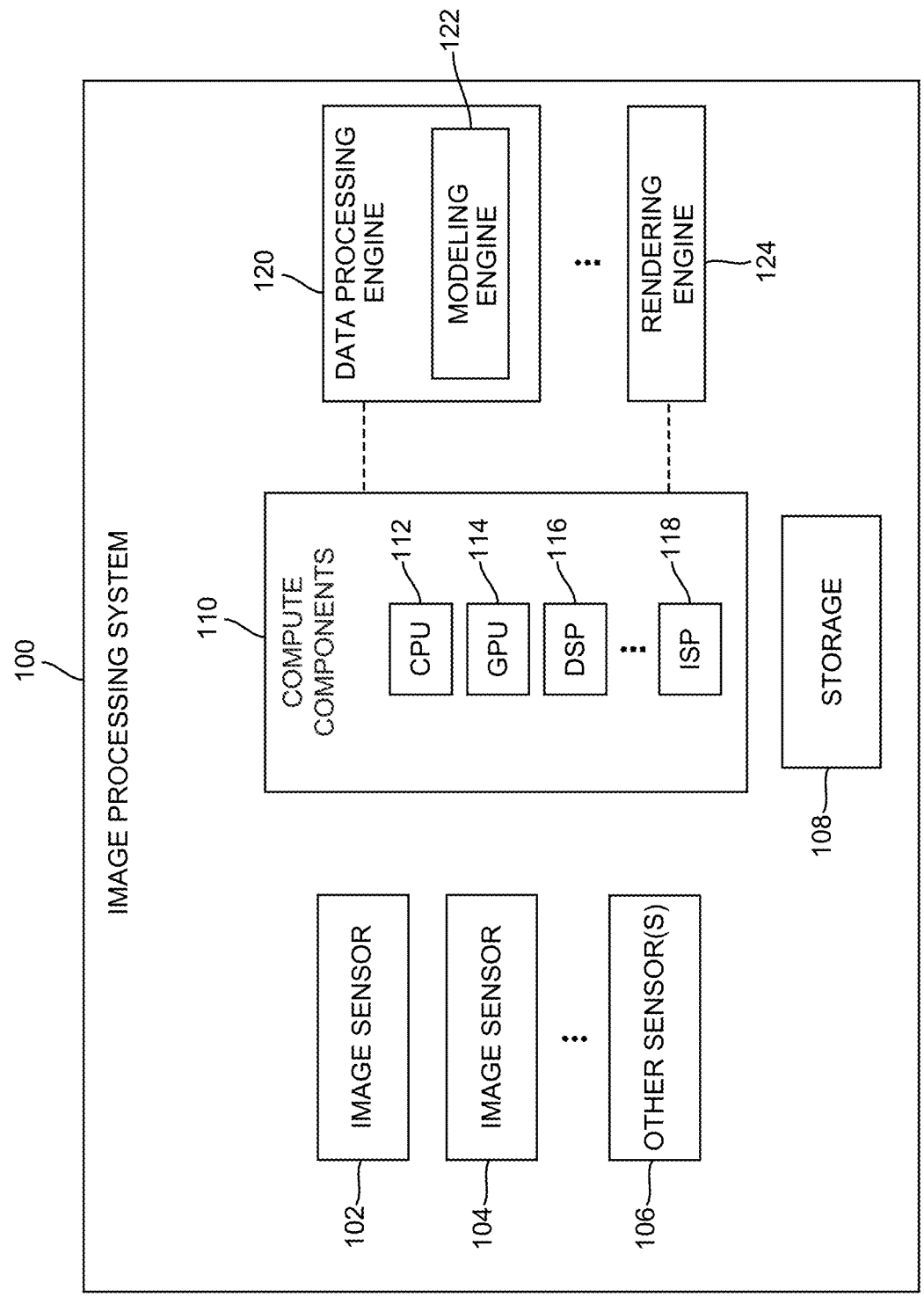
FIG. 1 is a simplified block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, extended reality (XR) technologies can include augmented reality (AR), virtual reality (VR), mixed reality (MR), and the like. XR technologies can combine real environments from the physical world (e.g., the real world) and virtual environments or content to provide users with XR experiences. The XR experiences allow users to interact with a real or physical environment enhanced or augmented with virtual content and vice versa. XR technologies can be implemented to provide functionalities and/or enhance user experiences in a wide range of contexts such as, for example, healthcare, retail, education, social media, entertainment, and so forth.

To provide realistic XR experiences, XR technologies can integrate virtual content with the physical world. In some examples, this can involve generating a map of the real-world environment and calculating a particular pose of the user's XR device relative to the map of the real-world environment in order to anchor virtual content to the real-world environment in a convincing manner. The pose information can be used to match virtual content with the user's perceived motion and the spatio-temporal state of the real-world environment. However, as the user with the XR device moves during the XR experience, the pose of the XR device (and the user) relative to the real-world environment changes. In some examples, the XR device can continuously or periodically track its position (and/or the position of one or more image sensors or cameras of the XR device) in the real-world environment. In some cases, there can be a mismatch between the relative pose estimated by the XR device and true or actual motion. Errors in the estimated poses or corrections applied in the pose estimation algorithm when performing the tracking can cause a variety of issues. For example, such errors in estimated poses or corrections can cause virtual content presented during the XR experience to appear misaligned or out of sync with the user's perceived motion and the spatio-temporal state of the real-world environment.

In some cases, the pose of the XR device can be recalculated to determine a more precise pose of the XR device relative to the real-world environment and better match virtual content presented during the XR experience with the user's perceived motion and the spatio-temporal state of the real-world environment. In some cases, a more-accurate pose of the XR device can be difficult to calculate and/or apply in the XR experience, such as when a movement of the XR device increases, further distorting the relationship between the estimated pose of the XR device and the spatio-temporal state of the real-world environment. Even if an accurate, corrected pose of the XR device is calculated during the XR experience, applying the corrected pose during the XR experience can cause various artifacts and degradations in the user experience. For example, if an XR system applies a corrected pose during an XR experience, the user can experience jitter in the rendered content, a shift in the rendered content, a tilt in the rendered content, movement in the rendered content, and/or other artifacts in the rendered content.

The magnitude of the artifacts and/or degradations experienced by the user can vary based on a number of factors, such as the type of digital content being rendered, the amount of motion experienced by the XR device (and causing changes in pose), the magnitude or size of the corrected pose, etc. For example, rendered artifacts experienced by a user when a corrected pose is applied to rendered content (e.g., during an XR experience) can be more noticeable when the corrected pose is applied while the user is viewing the rendered content and/or when the amount of content rendered increases while the corrected pose is applied.

In some aspects, systems, apparatuses, processes (also referred to as methods), and computer-readable media (collectively referred to herein as "systems and techniques") are described herein for correcting and aligning estimated poses in digital content experiences. In some examples, the systems and techniques described herein can render and represent digital content (e.g., virtual content) in a real-world coordinate system (e.g., a coordinate system or frame in a physical scene and/or environment). In some examples, the digital content can be aligned with a real-world gravity direction (e.g., a real-world horizon) in the real-world coordinate system. In some cases, the real-world gravity direction can include a direction of a gravitational field in a spatial coordinate system (e.g., the real-world coordinate system). For example, the real-world gravity direction can include a direction of a gravitational force interacting with a device, such as an XR device. In some examples, digital content can be aligned with a gravity direction in the real-world coordinate system so the digital content appears consistent with the user's perceived motion and the spatio-temporal state of the real-world environment.

In some cases, the systems and techniques can apply pose corrections during a digital content experience (e.g., an XR experience, etc.) while hiding and/or reducing visual artifacts that may otherwise appear in the rendered content when the pose of the scene (and/or digital content associated with the scene) is corrected. For example, in some cases, the pose corrections can be applied incrementally to limit and/or reduce the magnitude of changes in the rendered content and/or scene when the corrected pose is applied. In some examples, the pose corrections can be applied incrementally when the magnitude of the pose corrections exceeds a threshold and/or when the amount of motion experienced by the XR device and reflected in the pose correction exceeds a threshold. In other examples, the pose corrections can be applied when digital content affected by the pose corrections is not being rendered or presented to the user and/or when the amount of digital content (and/or number of digital content items) being (or to be) rendered or presented to the user is low (e.g., below a threshold).

Examples of the systems and techniques described herein for applying corrected poses in digital content experiences are illustrated in FIG. 1-FIG. 9 and are described below. FIG. 1 is a diagram illustrating an example image processing system 100. The image processing system 100 can perform pose correction as further described herein. Moreover, the image processing system 100 can implement various types of applications and/or perform various processing tasks, effects, computations, etc., such as, for example, chroma keying, extended reality, image registration and warping, motion tracking, pose estimation, object mapping, feature extraction, image detection and/or recognition (e.g., face detection and/or recognition, object detection and/or recognition, gender detection, eye gaze detection, age detection, etc.), depth estimation, automation, machine vision, object modeling, and/or any other applications and/or processing tasks, effects, and/or computations.

In some illustrative examples, the image processing system 100 can run XR applications and provide XR experiences to users of the image processing system 100. In some examples, the image processing system 100 can track a pose of the image processing system 100 (and/or one or more components of the image processing system 100) and render virtual content according to the tracked pose. The virtual content can be aligned to a real-world coordinate system and can be re-aligned to the real-world coordinate system to account for changes caused by the relative movement of the image processing system 100 and the real-world scene. In some cases, the image processing system 100 can calculate pose corrections during a digital content experience and apply the pose corrections to preserve spatio-temporal relationships between the rendered digital content, the real-world scene and the image processing system 100.

In some examples, the image processing system 100 can intelligently apply pose corrections during a digital content experience to avoid or limit the amount of rendered artifacts created by the pose correction. For example, if the image processing system 100 is providing an XR experience to a user and the amount of motion of the image processing system 100 (and thus the amount of changes in the pose of the image processing system 100) is above a threshold, the image processing system 100 can apply the pose correction incrementally so each incremental pose correction is not noticeable or less noticeable to the user associated with the image processing system 100. For example, if the amount of motion of the image processing system 100 since a previous pose was calculated and/or the delta (e.g., the difference) between the previous pose and a current pose is above a threshold, the image processing system 100 can divide the pose correction into multiple, smaller pose corrections. The image processing system 100 can then apply the multiple, smaller pose corrections across a period of time (e.g., across a number of images or frames) so each pose correction (and/or the overall pose correction) is less noticeable (or unnoticeable) to the user associated with the image processing system 100.

As another example, the image processing system 100 can apply a pose correction when the image processing system 100 is not rendering/presenting content for the user, when the content rendered (and/or a portion of the content rendered) by the image processing system 100 is outside of a field-of-view (FOV) of the user, and/or when the amount of content being rendered and/or within the FOV of the user (e.g., the number of content items being rendered and/or within a FOV of the user, the amount of content being rendered and/or within a FOV of the user, etc.) is below a threshold. By limiting and/or reducing the amount (and/or number) of digital content rendered by the image processing system 100 when the pose correction is applied, the image processing system 100 can limit and/or reduce the magnitude and/or number of artifacts experienced by the user such as, for example, the magnitude (and/or number of) any tilt in the rendered scene (and/or content), shift in the rendered scene (and/or content), motion in the rendered scene (and/or content), and/or any other artifacts caused by incongruences (or misalignment) and/or correction of incongruences between the state (e.g., location, motion, etc.) of the pose of the image processing system 100 and the state of the real-world scene (and/or parameters and/or contents of the real-world scene).

In the example shown in FIG. 1, the image processing system 100 includes image sensor 102, image sensor 104, storage 108, computing components 110, a data processing engine 120, a modeling engine 122, and a rendering engine 124. The image processing system 100 can also optionally include one or more other sensors 106, such as an additional image sensor(s), a depth sensor (using any suitable technology for determining depth), an infrared (IR) sensor, a gyroscope, an accelerometer, an inertial measuring unit (IMU), an audio sensor, etc.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a computer in a car, an Internet-of-Things (IoT) device, a system-on-chip (SoC), or any other suitable electronic device(s).

In some implementations, the image sensor 102, the image sensor 104, the one or more other sensors 106, the storage 108, the computing components 110, the data processing engine 120, the modeling engine 122, and the rendering engine 124 can be part of the same computing device. For example, in some cases, the image sensor 102, the image sensor 104, the one or more other sensors 106, the storage 108, the computing components 110, the data processing engine 120, the modeling engine 122, and/or the rendering engine 124 can be integrated into a smartphone, laptop, tablet computer, smart wearable device, gaming system, server, IoT device, television, and/or any other computing device. In other implementations, any of the image sensor 102, the image sensor 104, the one or more other sensors 106, the storage 108, the computing components 110, the data processing engine 120, the modeling engine 122, and/or the rendering engine 124 can be part of two or more separate computing devices.

The image sensor 102 and the image sensor 104 can include image sensors and/or image capturing devices capable of capturing images. For example, the image sensor 102 and the image sensor 104 can include one or more sensors capable of capturing red-green-blue (RGB) images. In some examples, an image (or frame) can include a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture. In some examples, the image processing system 100 can include both the image sensor 102 and the image sensor 104. In some cases, the image processing system 100 can include one or more additional image sensors. In some examples, the image processing system 100 can include the image sensor 102, and can optionally include or exclude the image sensor 104 (and/or any other image sensor).

In some cases, the image sensor 102 and the image sensor 104 can be any type of image sensor (or image capture devices) and/or video sensor (or video capture devices). For instance, the image sensor 102 and the image sensor 104 can include digital camera sensors, video camera sensors, smartphone camera sensors, image/video capture devices included as part of an electronic apparatus (e.g., a television, a computer, a camera, etc.). In some cases, the image sensor 102 and/or the image sensor 104 can be part of a camera or computing device, such as a digital camera, a video camera, an IP camera, a smartphone, a smart television, a game system, a scanner, a multi-camera system, or other computing device. For example, the image sensor 102 and/or the image sensor 104 can be part of a dual-camera system or device, such as a smartphone, a camera, etc. The image sensor 102 and the image sensor 104 can capture image data and/or video content (e.g., raw image and/or video data). The image data and/or video content can be processed by the computing components 110, the data processing engine 120, the modeling engine 122, and/or the rendering engine 124 as described herein.

The one or more other sensors 106 can be any sensor for detecting and measuring information such as force, distance, motion, position, depth, speed, light, etc. Non-limiting examples of other sensors include depth sensors (using any suitable technology for determining depth, such as using light or lasers), gyroscopes, accelerometers, magnetometers, IR sensors, inertial measurement units (IMUs), machine vision sensors, etc. In some cases, the image processing system 100 can include other sensors, such as an accelerometer, a gyroscope, an IMU, a smart scene sensor, an impact sensor, a position sensor, a tilt sensor, a light sensor, etc.

The storage 108 can be any storage device(s) for storing data, such as image or video data for example. Moreover, the storage 108 can store data from any of the components of the image processing system 100. For example, the storage 108 can store data or measurements from the image sensor 102, the image sensor 104, the one or more other sensors 106, the computing components 110 (e.g., parameters, outputs, generated images, calculation results, models, etc.), and/or data from any of the data processing engine 120, the modeling engine 122, and/or the rendering engine 124 (e.g., output images, processing results, models, etc.). In some examples, the storage 108 can include a buffer for storing data (e.g., image data) for processing by the computing components 110.

In some implementations, the computing components 110 can include a central processing unit (CPU) 112, a graphics processing unit (GPU) 114, a digital signal processor (DSP) 116, and/or an image signal processor (ISP) 118. The computing components 110 can perform various operations such as tracking, mapping, video gaming, modeling, image enhancement, object or image segmentation, computer vision, graphics rendering, extended reality (e.g., virtual reality, augmented reality, etc.), image/video processing, sensor processing, recognition (e.g., facial recognition, object recognition, speech recognition, pattern recognition, etc.), detection (e.g., text detection, object detection, feature detection, face detection, expression detection, eye gaze detection, pattern detection, scene change detection, etc.), machine learning, depth estimation, filtering, automation, and any of the various operations described herein. In some examples, the computing components 110 can implement the data processing engine 120, the modeling engine 122, and the rendering engine 124. In other examples, the computing components 110 can also implement one or more other processing engines.

The operations for the data processing engine 120, the modeling engine 122, and the rendering engine 124 can be implemented by one or more of the computing components 110. In one illustrative example, the data processing engine 120 and the modeling engine 122 (and associated operations) can be implemented by the CPU 112, the DSP 116, and/or the ISP 118, and the rendering engine 124 (and associated operations) can be implemented by the GPU 114. In some cases, the computing components 110 can include other electronic circuits or hardware, computer software, firmware, or any combination thereof, to perform any of the various operations described herein.

In some cases, the computing components 110 can receive data (e.g., image data, audio data, sensor measurements, etc.) captured by the image sensor 102, the image sensor 104, and/or the one or more other sensors 106 and track a pose of the image processing system 100 in a real-world scene and apply a pose correction to digital content rendered by the image processing system 100 in a digital content experience such as an XR experience. In some examples, the computing components 110 can transform a pose of the image processing system 100 from a reference frame of the image processing system 100 to a real-world coordinate frame. In some cases, the computing components 110 can apply the pose of the image processing system 100 in the real-world coordinate frame to reder digital content in a digital content experience while maintaining the spatio-temporal relationships of the image processing system 100, the real-world scene, and the digital content rendered by the image processing system 100. In some examples, when applying the corrected pose, the computing components 110 can reduce or limit the number of artifacts in the rendered content caused by the implementation of the corrected pose.

The computing components 110 can implement the data processing engine 120 and/or the modeling engine 122 to perform various processing operations, such as XR operations, modeling, tracking, scene mapping, pose estimation, depth estimation, XR rendering, computer vision, etc. For example, the computing components 110 can implement the data processing engine 120 and/or the modeling engine 122 to perform tracking, mapping, and/or XR rendering operations as further described herein. The computing components 110 can process data captured by the image sensor 102 and/or the image sensor 104 (and any other image sensors), measurements captured by the one or more other sensors 106, data (e.g., image data, measurements, metadata, parameters, preferences, etc.) stored in the storage 108, data received from a remote source (e.g., a remote camera, a server, a content provider, any combination thereof, and/or other remote source), data obtained from a combination of sources, any combination thereof, and/or other image data.

In some examples, the modeling engine 122 can be part of or implemented by the data processing engine 120. In other examples, the modeling engine 122 can be separate from (e.g., not part of or implemented by) the data processing engine 120. In some cases, the modeling engine 122 can include (e.g., can implement, can contain, can generate etc.) one or more models. For example, in some cases, the modeling engine 122 can include and/or implement one or more neural network models. In some examples, the data processing engine 120 and/or the modeling engine 122 can implement any other models, such as any type of statistical models, neural network models, tracking models, etc.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, one or more input devices, and/or other hardware or processing devices that are not shown in FIG. 1. An illustrative example of a computing device and hardware components that can be implemented with the image processing system 100 is described below with respect to FIG. 9.

As previously explained, to provide realistic XR experiences, XR technologies can integrate virtual content with the physical world. In some examples, this can involve generating a map or model of the real-world environment and calculating a particular pose of the user's XR device relative to the map of the real-world environment in order to anchor virtual content to the real-world environment in a convincing manner. The pose information can be used to match virtual content with the user's perceived motion and the spatio-temporal state of the real-world environment. However, as the user with the XR device moves during the XR experience, the pose of the XR device (and the user) relative to the real-world environment changes. In some examples, the XR device can continuously estimate its pose relative to the real-world environment. As noted above, errors in the pose estimates or corrections applied to the pose estimates can cause virtual content presented during the XR experience to appear misaligned or out of sync with the user's perceived motion and the spatio-temporal state of the real-world environment.

For example, in some cases, the XR device can continuously (or periodically) estimate the gravity direction. However, errors in the gravity direction estimation can cause a misalignment of the map or model of the real-world environment. In some examples, an initial estimate of a gravity direction may not be accurate and can be corrected over time. The inaccuracy of the gravity direction estimate can cause the misalignment of the map or model, as noted above. In some cases, the misalignment can be higher at the start of tracking in the XR experience.

Figure 2A:
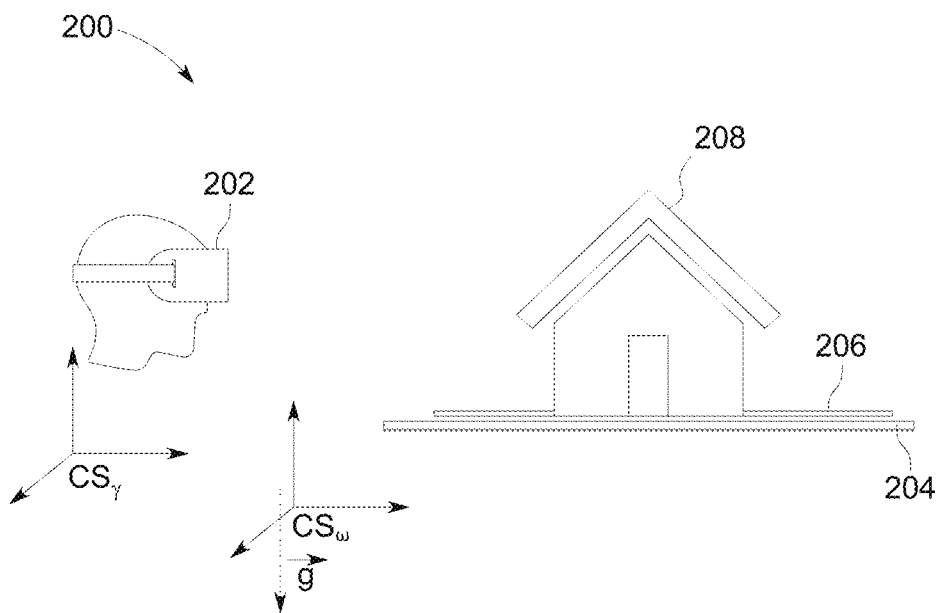
FIG. 2A and FIG. 2B are diagrams illustrating example alignments of digital content and a real-world coordinate frame, in accordance with some examples of the present disclosure.
Figure 2B:
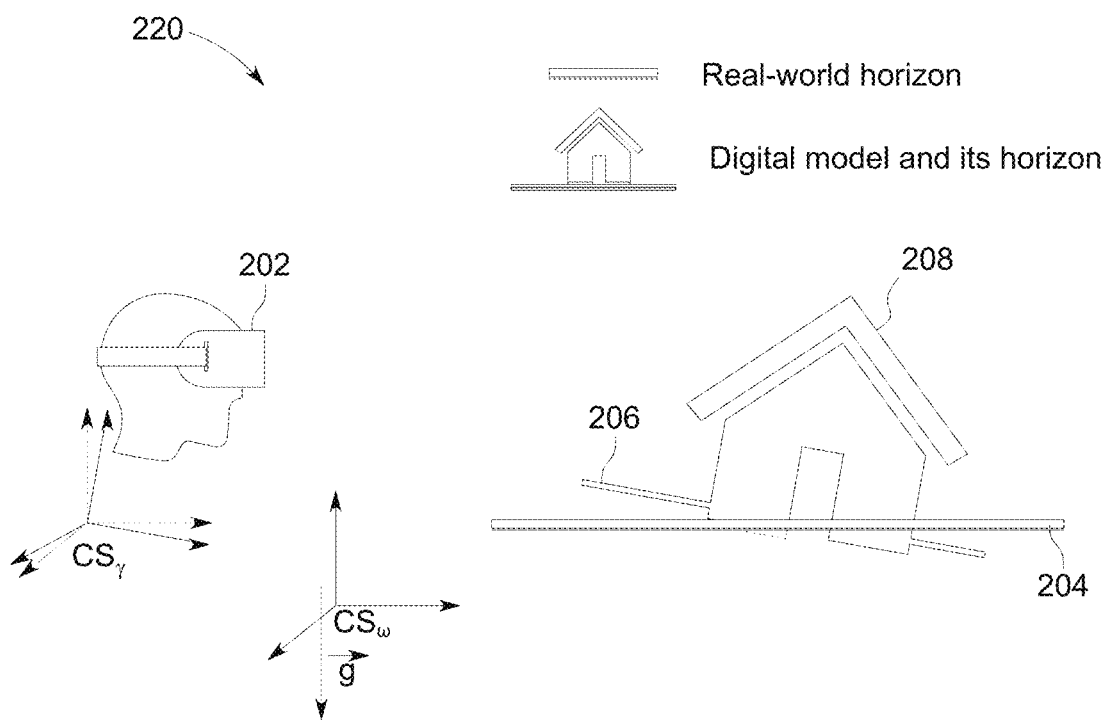

FIG. 2A and FIG. 2B are diagrams illustrating example alignments of digital content and a real-world coordinate frame. In the example alignment 200 shown in FIG. 2A, the digital content 208 and a gravity direction 206 (e.g., a horizon direction in a real/physical world/scene) of the digital content 208 are aligned with the gravity direction 204 in the real-world scene. In this example, the XR device 202 can render the digital content 208 aligned with the real-world scene. The digital content 208 can appear to retain one or more spatio-temporal relationships with the real-world scene when viewed from the XR device 202.

In some examples, the digital content 208 is represented in a coordinate system of the real-world scene. The digital content 208 can be aligned to the gravity direction 204 (or horizon direction). In some cases, the XR device 202 can render the digital content 208 at a start of service frame (e.g., an initial frame). The XR device 202 can start with a coordinate system that is gravity aligned (e.g., aligned to the gravity direction 204). The XR device 202 can continue to track the pose of the XR device 202 and apply pose corrections based on changes in the pose of the XR device 202. In some examples, the XR device 202 can apply subsequent updates to maintain the gravity direction 206 of the digital content 208 aligned with the gravity direction 204 of the real-world scene.

Inaccuracies and misalignments in the real-world coordinate system and the digital content 208 can cause various artifacts in the rendered content. For example, with reference to FIG. 2B, a misalignment 220 can cause the digital content 208 to appear tilted relative to the real-world scene (and/or the real-world coordinate system). To illustrate, in some examples, the gravity direction estimated by the XR device 202 at the start of the XR experience (and/or the tracking) may not be accurately/correctly aligned with the real-world gravity direction. The error in the gravity direction estimate can cause the digital content 208 to be misaligned. The XR device 202 can improve the gravity estimate over time using techniques described herein.

In another example, if the XR device 202 moves causing a change in the pose of the XR device 202 relative to the real-world scene. Errors in the estimated gravity direction 206 can cause the gravity direction 206 of the digital content 208 to become misaligned with the gravity direction 204 in the real-world scene. The digital content 208 will appear to be tilted in relation to the real-world scene. To correct such tilt, the XR device 202 can calculate a pose correction and use the pose correction to re-align the digital content 208 and the gravity direction 206 of the digital content 208 with the gravity direction 204 of the real-world scene.

In some cases, if the magnitude of the misalignment between the gravity direction 206 of the digital content 208 and the gravity direction 204 of the real-world scene is large, the pose correction applied by the XR device 202 to correct the misalignment can cause artifacts in the rendered scene such as a shift and/or movement in the digital content 208 and/or the real-world scene. In some examples, to avoid and/or reduce the amount of artifacts rendered by the XR device 202 and/or perceived by the user, pose corrections can be applied incrementally. For example, if the magnitude of the changes in the pose of the XR device 202 (and/or motion experienced by the XR device 202) exceeds a threshold, the XR device 202 can apply pose corrections incrementally to avoid and/or reduce the amount of artifacts rendered by the XR device 202 and/or perceived by the user.

In some cases, the XR device 202 can be part of or implemented by the image processing system 100. In other cases, the XR device 202 can be part of or implemented by another computer device(s). In some examples, the XR device 202 can estimate a gravitational force and include gravity estimates in tracking state calculated by the XR device 202. The XR device 202 can use the gravity estimates to align the digital content 208 to a real-world horizon or gravity direction, as further explained herein.

Figure 3:
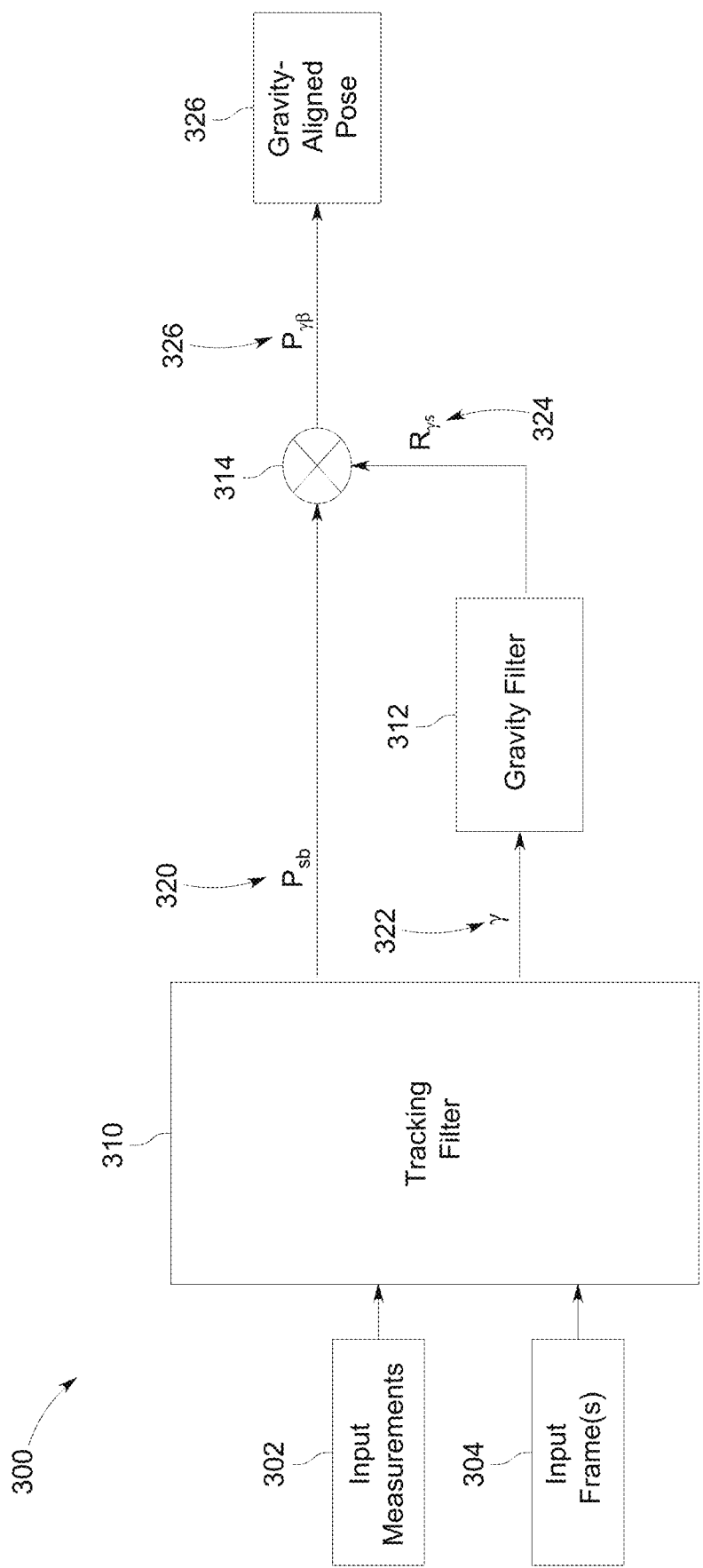
FIG. 3 is a diagram illustrating an example process for estimating gravity and using gravity estimates to align a scene with a spatial coordinate frame, in accordance with some examples of the present disclosure.

FIG. 3 is a diagram illustrating an example process 300 for estimating gravity and using gravity estimates to align a scene (and/or associated digital content) with a spatial coordinate frame. The spatial coordinate frame can include a real-world coordinate system in space (e.g., in the real/physical world) aligned along a gravity direction (e.g., along gravity direction 204) in a real-world scene. Other spatial coordinate frames can include a spatial coordinate system from the perspective, point of view, and/or pose of a system implementing the example process 300.

In some examples, the system implementing the example process 300 can include an electronic device(s) providing a digital content experience, such as an XR experience. For example, the system implementing the example process 300 can include the image processing system 100 shown in FIG. 1 or the XR device 202 shown in FIG. 2A and FIG. 2B. For explanation and illustration purposes, the example process 300 will be described with reference to the image processing system 100. However, as noted above, the system implementing the example process 300 (and/or aspects thereof) can include any other electronic device(s), such as the XR device 202 or any other device.

As shown in FIG. 3, a tracking filter 310 can calculate a pose ($P_{sb}$) 320 of the system (e.g., image processing system 100) in a reference frame of the system and can calculate a gravity estimate ($\gamma$) 322 for aligning digital content (e.g., XR content) to a gravity direction (e.g., gravity direction 204). In some examples, the tracking filter 310 can calculate the pose 320 of the system and the gravity estimate ($\gamma$) 322 based on the input measurements 302 and the input frame 304 (also referred to as input image). In some examples, the gravity estimate 322 can include a gravity vector identifying a gravity direction. In some cases, the gravity estimate 322 can include a spatial frame s aligned with gravity (e.g., aligned with a gravity direction).

In some cases, the pose ($P_{sb}$) 320 of the system can include a pose matrix P describing the position and rotation of the system (e.g., the position and rotation of a body b of the system) or a sensor of the system in a spatial frame s. In some examples, the spatial frame s can be a reference frame from the perspective or point of view (or pose) of the system. In some cases, the pose ($P_{sb}$) 320 of the system can include rotation values for the system in the spatial frame s and translation values for the system in the spatial frame s. For example, in some cases, the pose ($P_{sb}$) can equal [$R_{sb}, T_{sb}$], where $R_{sb}$ are rotation values for the system in the spatial frame s and $T_{sb}$ are translation values for the system in the spatial frame s.

In some cases, the tracking filter 310 can detect/extract features in the input frame 304 and use the detected/extracted features from the input frame 304 with the input measurements to compute the pose 320 and the gravity estimate 322. In some examples, the features in the input frame 304 can include, without limitation, visual attributes, objects, image regions, spatial coordinates (e.g., locations along a vertical (y), horizontal (x) and/or depth (z) dimensions), orientation parameters, translation parameters, etc.

In some examples, the tracking filter 310 can be a Kalman filter, an extended Kalman filter (EFK), or any other tracking filter. The tracking filter 310 can use the input measurements 302 and the input frame 304 to calculate the pose 320 and the gravity estimate 322. The input measurements 302 can include measurements from one or more sensors of the system, such as the one or more other sensors 106. For example, the input measurements 302 can include acceleration measurements, gravitational force measurements, orientation measurements, angular velocity measurements, etc., calculated using one or more sensors. In some examples, the input measurements 302 can include an acceleration, gravitational force, orientation, and angular velocity of the system (e.g., the image processing system 100) measured at one or more points in time.

In some examples, gravity can be estimated as part of a tracking state. In some cases, the input measurements 302 can include accelerator and gyroscope measurements. In some examples, accelerometers can measure an external force and a gravitational force on the system (e.g., image processing system 100). When the sensor (e.g., a sensor(s) from the one or more other sensors 106) that captured at least a portion of the input measurements 302 is static, the acceleration (a) of the sensor can be equal to 0 m/s² (e.g., $\alpha=0$ m/s²), based on the gravitational acceleration of an object in a vacuum near the surface of the Earth (e.g., which is approximately 9.80665 m/s²) where m denotes meters and s denotes seconds.

In some examples, the input measurements 302 output by the sensor (e.g., by a sensor(s) of the one or more other sensors 106) can include and/or can be used to determine a state tracking model. In some cases, the state tracking model can be described by Equation (1) below:

$$b_{y_{acc}}(t) = A_a R_{sb}^t(t)(s_{\alpha(t)} - s_\gamma) + b_a + n_a \qquad \text{Equation (1)}$$

where $$A_a = \begin{bmatrix} k_a^1 & v_a^1 & v_a^2 \\ 0 & k_a^2 & v_a^3 \\ 0 & 0 & k_a^3 \end{bmatrix},$$

s is a spatial coordinate frame, $s_{\alpha(t)}$ is a linear acceleration (m/s²) of the sensor in the spatial coordinate frame, $s_\gamma$ is a gravity direction in the spatial coordinate frame, $b_a$ represents one or more biases or weights, $k_a^i$ are scale factors, $v_a^i$ represents nonorthogonalities from calibration of the sensor, and $n_a$ can represent noise in the measurements. In some cases, the spatial coordinate frame s can be based on a pose of the sensor (and/or the system) when tracking is initiated by the system (e.g., image processing system 100). In some examples, the spatial coordinate frame s can be a spatial frame from a perspective, point of view and/or pose of the system (e.g., image processing system 100) when the process 300 is initiated and/or the digital content experience is initialized. In some cases, the spatial coordinate frame can be fixed throughout a particular tracking session. For example, the spatial coordinate frame can have a fixed position and orientation in the real world as tracking is performed.

In the example process 300 shown in FIG. 3, the tracking filter 310 can provide the gravity estimate 322 to a gravity filter 312 that computes gravity estimates from gravity samples/outputs from the tracking filter 310. The gravity filter 312 can use the gravity estimate 322 from the tracking filter 310 to compute and output a rotation estimate ($R_{\gamma s}$) 324 corresponding to the gravity estimate 322. In some examples, the gravity filter 312 can use a gravity vector from the gravity estimate 322 to compute a rotation matrix ($R_{\gamma s}$) corresponding to the gravity vector. In some cases, the rotation matrix ($R_{\gamma s}$) can include rotation values for aligning a spatial frame s to the gravity direction defined and/or represented by the gravity vector.

A multiplier 314 can use the pose 320 from the tracking filter 310 and the rotation estimate 324 from the gravity filter 312 to generate a gravity-aligned pose ($P_{\gamma b}$) 326. In some examples, the gravity-aligned pose 326 can include a pose matrix describing a position and orientation of the system (e.g., a position and orientation of the body b of the system) in a gravity-aligned spatial frame (e.g., a spatial frame that is aligned with a gravity direction in a real-world coordinate system). In some cases, the multiplier 314 can generate the gravity-aligned pose 326 based on a matrix multiplication of a pose matrix associated with the pose 320 and a rotation matrix associated with the rotation estimate 324.

In some examples, the multiplier 314 can multiply rotation and translation parameters of the pose 320 with rotation parameters of the rotation estimate 324 to generate the gravity-aligned pose 326. For example, in some cases, the multiplier 314 can use Equation (2) below to generate the gravity-aligned pose 326:

$$R_{\gamma b}=[R_{\gamma s}*R_{sb}, R_{\gamma s}*T_{sb}]=[R_{\gamma b}, T_{\gamma b}] \quad \text{Equation (2)}$$

Where $R_{\gamma s}$ is a rotation matrix corresponding to the gravity vector, $R_{sb}$ is a matrix describing the rotation of the system (e.g., image processing system 100) in a spatial frame, $T_{sb}$ is a matrix describing the translation of the system (e.g., image processing system 100) in a spatial frame, $R_{\gamma b}$ is a rotation matrix describing the rotation of the system in a gravity-aligned spatial frame, and $T_{\gamma b}$ is a translation matrix describing the translation of the system (e.g., system b) in a gravity-aligned spatial frame.

In some cases, the initial gravity estimate can be computed when the system is static to avoid introducing errors caused by acceleration of the system. For example, in some cases, positive acceleration values (and/or forces) can affect a gravity estimate. Thus, to avoid skewing a gravity estimate, the system can wait until the input measurements 302 indicate that the system is static to compute an initial gravity estimate. In other cases, the initial gravity estimate can be computed when the system is not static. For example, if tracking is initialized when the system is moving, the system can compute an initial gravity estimate even though the system is moving. In some cases, the initial gravity estimate may contain errors from external forces (e.g., acceleration) applied to the moving system. However, the system (e.g., the tracking filter 310) can correct the gravity estimates over time as further described herein.

In some examples, the initial gravity estimate can be computed when the system is moving based on one or more accelerometer measurements and an assumption that the system is static. For example, the initial gravity estimate can be computed when the system is moving by averaging accelerometer measurements and assuming that the system is static. As previously noted, the initial gravity estimate can be improved and/or refined over time through additional gravity computations and/or input measurements. For instance, even if the initial gravity estimate is computed when the system is not static and contains one or more errors, the gravity estimate can be improved and/or refined in subsequent estimates. In some examples, an error or loss of a gravity estimate can be calculated and used to refine the gravity estimate. In some cases, an L1 loss function (e.g., a least absolute deviations loss function) or an L2 loss function (e.g., a least square errors function) can be used to minimize an error in a gravity estimate. In some examples, gravity estimates from the tracking filter (e.g., the EFK filter or other tracking filter) can be noisy. In some cases, the system can perform L1 averaging to obtain a refined gravity estimate that is less noisy. For example, the system can compute the L1 average or mean of a set of 3D gravity estimate directions. The L1 average or mean can minimize the sum of the angles from the average/mean direction to the set of 3D gravity estimate directions.

In some cases, a gravity direction (e.g., gravity estimate 322) can be determined within and/or in a spatial coordinate system in a real-world scene. In some examples, the gravity direction can be estimated and improved over time as a part of state estimations by the tracking filter 310 from the input measurements 302 and the input frame 304. As new gravity estimates are calculated after the initial gravity estimate, the gravity estimates can improve and can correct for any or some errors or drift in the initial gravity estimate. For example, if the input sensor (e.g., image sensor 102, one or more other sensors 106) is not completely or substantially static, the motion of the input sensor can introduce an amount of error to the initial gravity estimate. However, as additional motion information and gravity estimates are obtained, the accuracy of the gravity estimates can increase and/or can correct for any motion that may have caused errors and/or inaccuracies in the initial gravity estimate.

In some cases, gravity estimates from the tracking filter 310 can change and/or fluctuate, so applying the gravity estimates from the tracking filter 310 directly or too quickly to align the digital content rendered by the system with the real-world coordinate system (and/or associated gravity or horizon direction) can cause artifacts in the rendered digital content such as jitter, motion, jerking, etc., in the rendered scene. In some examples, to avoid artifacts in the rendered digital content caused by changes in alignment, the gravity estimates from the tracking filter 310 can be used to more gradually align the digital content rendered by the system with the real-world coordinate system (and/or associated gravity or horizon direction). In some cases, the gravity estimates and gradual alignment can be implemented over a period of time and/or a number of frames to reduce or avoid any artifacts perceived by the user when the digital content is aligned with the gravity or horizon direction in the real-world coordinate system.

In some examples, the system can apply new gravity estimates when system is static or almost static. In some cases, the gravity filter 312 can consider new gravity samples from the tracking filter 310 when the system is static or almost static. As previously explained, in other cases, the system can apply new gravity estimates even if the system is in motion.

In some cases, when a new gravity estimate from the gravity filter 312 is applied to the digital content (and/or the scene) rendered by the system, the horizon of the digital content (e.g., the horizon of the scene) can tilt a certain amount if the digital content is not accurately aligned with gravity. In some examples, when the new gravity estimate is applied while the system is static or almost static, the tilt can be more visible to the user of the system because the tilt occurs when the user of the system is also static or almost static. In some cases, a tilt that is more visible or has a higher magnitude can create an uneasy feeling to the user of the system. In some examples, a correction of gravity applied to the digital content rendered by the system can also shift the digital content being rendered. For example, the gravity correction applied to a rendered scene can cause a shift in the rendered scene. In some cases, a map connection event and/or loop closure event can result in sudden jump in the scene rendered by the system. In many cases, the user can observe more (and/or more severe) visual artifacts when the user's head is static (or almost static). Such visual artifacts can be exaggerated and/or aggravated when gravity correction (e.g., horizon correction) is applied during static motion or almost static motion.

Visual artifacts such as those described above can negatively impact the user's digital content experience. In some examples, the systems and techniques described herein can calculate reliable gravity estimates/vectors and apply gravity and pose corrections while avoiding and/or reducing visual artifacts from the gravity and pose corrections. In some examples, the systems and techniques described herein can estimate gravity vectors and apply pose corrections in an incremental manner to reduce the number and/or magnitude of visual artifacts. In some cases, the systems and techniques described herein can estimate gravity vectors and apply pose corrections when the system is static or in motion. For example, the systems and techniques described herein can estimate gravity vectors and apply pose corrections and/or alignment corrections when the system is in motion (or in faster motion). The pose corrections and/or alignment corrections can be applied in an incremental way to reduce visual artifacts and improve the user experience.

In some cases, an incremental correction (e.g., an incremental pose correction, an incremental alignment correction, etc.) can be applied when there is loop closure event, after a map connection, when a gravity vector is updated, when the system is static or in motion, and/or at any other point or event. In some examples, incremental corrections can be applied during faster angular and/or translation motion. In some cases, when there is faster angular motion in the pitch and/or roll direction, a roll correction can be applied in the roll motion and a pitch correction can be applied in the pitch motion.

Incremental rotations can also be computed in such a way that a correction of a scene is not as visible or noticeable to a user. For example, incremental rotations can be implemented gradually to minimize the visible impact of the rotations on the scene. As another example, incremental rotations can be implemented when the user is not viewing the scene and/or a portion of the scene affected by the incremental rotations. In some cases, exponential smoothening can be used when implementing incremental rotations to reduce the visible impact on the rendered scene. In other examples, incremental rotations can be implemented according to a fixed angle per fast frame scheme.

In some cases, corrections in XR experiences can be applied based on the content in the rendered scene. For example, corrections can be applied when there is limited (or no) content in the rendered scene, when the user is not viewing the rendered scene or a portion of the rendered scene affected by a correction, etc. In some cases, gravity vectors calculated can be saved in a simultaneous localization and mapping (SLAM) map, and previously estimated stable alignment information can be applied in a new tracking session and/or period. As previously explained, in some examples, incremental corrections after map connections, loop closure events, and/or any other incremental corrections can be implemented in an incremental way. The incremental implementation of corrections can reduce visual artifacts and improve the user digital content experience.

Figure 4A:
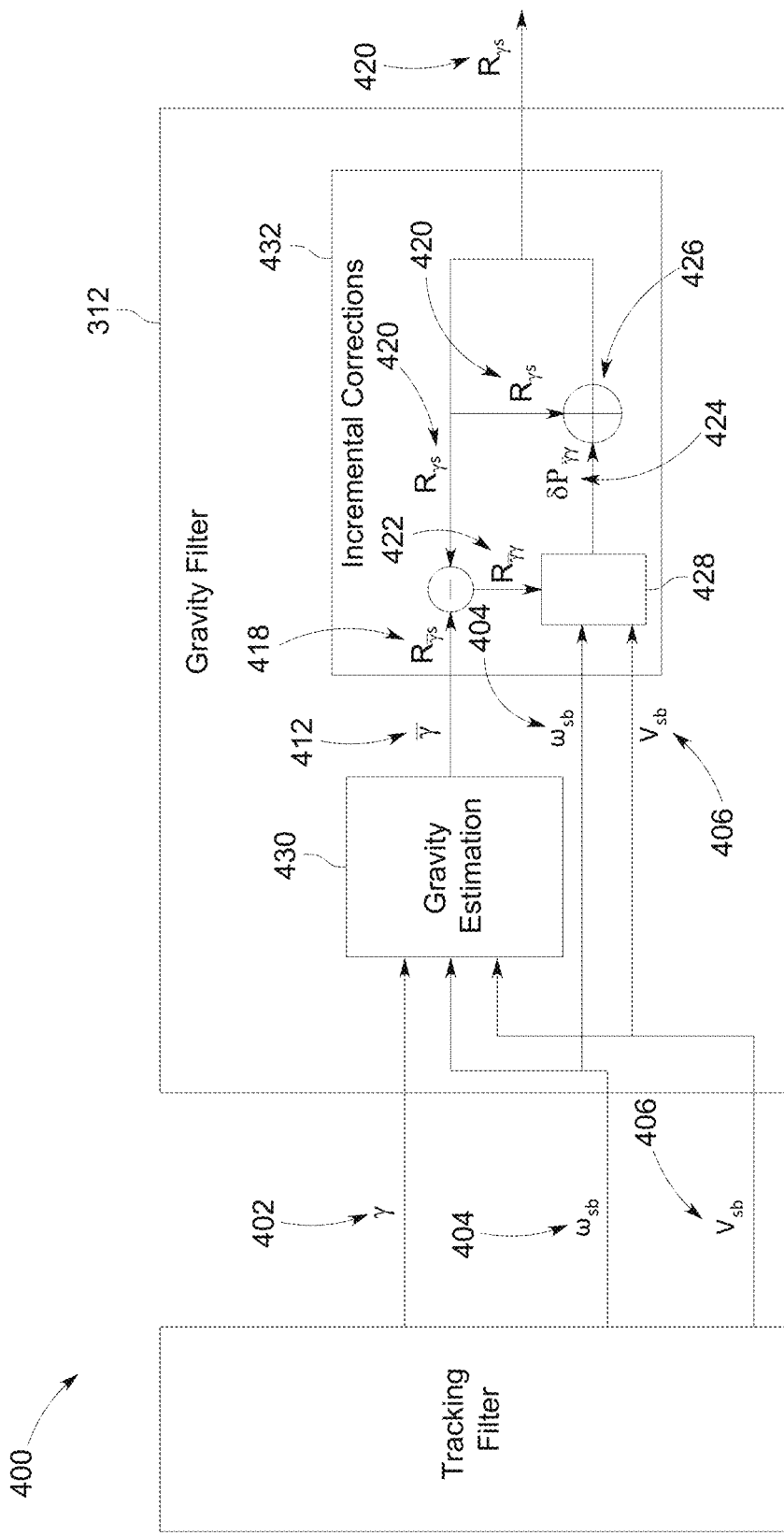
FIG. 4A is a diagram illustrating an example alignment system for incrementally applying alignment corrections to a scene using gravity information, in accordance with some examples of the present disclosure.

FIG. 4A is a diagram illustrating an example alignment system 400 for incrementally applying alignment corrections to a scene (and/or associated virtual content) using gravity information. As previously explained, as a device moves during a tracking or XR experience, the movement of the device can cause the rendered content to become misaligned with the real-world scene (e.g., the physical world/environment). In some examples, the device can continuously track its position (and/or the position of a camera device of the device) in the real-world environment. However, in some cases, there can be a mismatch between the relative pose estimated by the device and true or actual motion. Errors in the estimated poses or corrections applied in the pose estimation algorithm during tracking can cause a variety of issues. For example, such errors in estimated poses or corrections can cause the virtual content in the rendered scene (and/or a map of the scene used to track and render content) and the real-world scene (and/or the real-world coordinate frame) to become misaligned as shown in FIG. 2B.

In some cases, when the rendered scene is re-aligned with the real-world scene, the user can experience visual artifacts such as, for example, jitter and/or shifting in the rendered scene. The visual artifacts can be particularly noticeable and/or severe as the movement of the device increases, which can cause a greater misalignment between the rendered scene and the real-world scene. The example alignment system 400 can use gravity information, such as an estimate of the gravity direction, to estimate alignment corrections for the rendered content. The example alignment system 400 can also apply alignment corrections incrementally to prevent and/or reduce visual artifacts caused by the alignment correction. For example, by more gradually applying smaller alignment corrections, the example alignment system 400 can prevent and/or reduce visual artifacts at each incremental correction and/or at the overall correction.

In the example shown in FIG. 4A, the example alignment system 400 can use a tracking filter 310 and a gravity filter 312 to apply incremental corrections to rendered content, such as a rendered scene, and/or a map of the real-world scene used to track and/or render digital content within and/or relative to a real-world coordinate system (e.g., the real-world scene). In this example, the tracking filter 310 can provide a gravity estimate ($\gamma$) 402, an angular velocity ($\omega_{sb}$) measurement 404, and a linear velocity ($V_{sb}$) measurement 406 to a gravity estimation block 430 of the gravity filter 312. The tracking filter 310 can also provide the angular velocity measurement 404 and the linear velocity measurement 406 to an incremental correction block 432 of the gravity filter 312.

The angular velocity measurement 404 can describe the angular velocity of the system ($\omega_{sb}$) and the linear velocity measurement 406 can describe the linear velocity of the system ($V_{sb}$). The system can include, for example, the image processing system 100 shown in FIG. 1, the XR device 202 shown in FIG. 2A and FIG. 2B, or any other electronic device(s).

The gravity estimation block 430 can use the gravity estimate ($\gamma$) 402, the angular velocity ($\omega_{sb}$) measurement 404, and the linear velocity ($V_{sb}$) measurement 406 to generate a new gravity estimate ($\bar{\gamma}$) 412. The incremental correction block 432 of the gravity filter 312 can use the new gravity estimate 412 to calculate a rotation matrix ($R_{\bar{\gamma}s}$) 418 for aligning a scene to a real-world gravity direction (e.g., to a real-world horizon). The rotation matrix 418 can include rotation parameters or values for rotating a scene (and/or virtual/digital content) to align to the real-world gravity direction.

In some cases, the gravity estimate 412 calculated by the gravity estimation block 430 can be a more robust, accurate, reliable, smoothened and/or refined gravity estimate than the gravity estimate 402 from the tracking filter 310. For instance, in some cases, gravity samples or estimates from the tracking filter 310 can have noise and/or can be susceptible to noise/errors, such as if the gravity samples or estimates are calculated when there is faster and/or increasing motion of the system. In one illustrative example, as the amount of motion of the system decreases, the angular velocity measurement 404 and/or the linear velocity measurement 406 from the tracking filter 310 can also decrease. On the other hand, as the amount of motion of the system increases, the angular velocity measurement 404 and/or the linear velocity measurement 406 as well as the amount of noise in the gravity estimate 402 from the tracking filter 310 can also increase. To reduce the amount of noise in the gravity estimate 402 and/or increase the accuracy/reliability of the gravity estimate 402, the gravity estimation block 430 can use the gravity estimate 402, the angular velocity measurement 404 and the linear velocity measurement 406 from the tracking filter 310 to calculate a new gravity estimate 412 (e.g., the new gravity estimate 412).

In some cases, the gravity estimation block 430 can calculate the new gravity estimate 412 based on an L1 averaging of gravity estimates 402 from the tracking filter 310. In some examples, the gravity estimation block 430 can compute an L1 mean of a number of gravity ($\gamma$) samples from the tracking filter 310, and use the L1 mean to compute the new gravity estimate 412. In some cases, the gravity estimation block 430 can compute the new gravity estimate 412 when the system is static or a movement of the system is below a threshold. By calculating the new gravity estimate 412 when the system is static or a movement of the system is below a threshold, the gravity estimation block 430 can reduce the amount of noise in the new gravity estimate 412 and/or otherwise improve the accuracy of the new gravity estimate 412. In other cases, the gravity estimation block 430 can compute the new gravity estimate 412 when the system is moving (above the threshold or otherwise), and improve the gravity information through subsequent gravity estimates.

The incremental correction block 432 can use the new gravity estimate 412 to update an alignment of the scene rendered by the system so the rendered scene (and/or associated virtual content) is better aligned to a gravity direction of a real-world coordinate system (e.g., to the real-world horizon/gravity plane or dimension). In some examples, the incremental correction block 432 can compute a delta rotation ($R_{\bar{\gamma}\gamma}$) 422 between the rotation matrix ($R_{\bar{\gamma}s}$) 418 and a previous rotation matrix ($R_{\gamma s}$) 420. The delta rotation 422 can include a rotation matrix with rotation parameters calculated based on a difference between the rotation matrix 418 and the previous rotation matrix 420. The delta rotation 422 can define the alignment correction for aligning the rendered scene (and/or associated virtual content) to the gravity direction of the real-world coordinate system.

An alignment update block 428 of the incremental correction block 432 can optionally divide or segment the alignment correction defined by the delta rotation 422 into smaller alignment corrections that can be applied more gradually over a period of time and/or a number of frames to prevent and/or reduce visual artifacts in the scene that can be caused by larger corrections of the scene. For example, if the magnitude of correction from the delta rotation 422 is large and/or above a threshold, the alignment update block 428 can divide or segment the correction from the delta rotation 422 into smaller corrections. In other cases, if the magnitude of correction from the delta rotation 422 is low and/or below a threshold, the incremental correction block 432 can apply the entire correction from the delta rotation 422 instead of dividing or segmenting the correction into smaller corrections and applying the smaller corrections over time and/or multiple frames.

The alignment update block 428 can use the angular velocity measurement 404 from the tracking filter 310, the linear velocity measurement 406 from the tracking filter 310 and the delta rotation 422 to calculate an incremental correction ($\delta R_{\bar{\gamma}\gamma}$) 424 to apply to a frame. The incremental correction 424 can include a smaller correction from the delta rotation 422 that the incremental correction block 432 can apply to a frame, such as a current or next frame. In some cases, the incremental correction 424 can include an incremental alignment matrix with rotation parameters.

The incremental correction block 432 can apply similar, smaller corrections (e.g., similar incremental corrections) from the delta rotation 422 over a period of time and/or across multiple frames until the entire correction from the delta rotation 422 has been applied and/or the rendered scene is aligned with the gravity direction of the real-world coordinate system. The application of smaller, incremental corrections over a larger period of time and/or number of frames can prevent or reduce the effects (e.g., visual artifacts) perceived by the user from the alignment correction.

Once the alignment update block 428 has generated the incremental correction 424, a multiplier 426 can apply the incremental correction 424 to the scene. For example, the multiplier 426 can apply the incremental correction 424 to a current frame being rendered and/or to be rendered by the system. In some examples, to incrementally update the scene alignment, the multiplier 426 can perform a matrix multiplication using the incremental correction 424 and the previous rotation matrix 420. The multiplier 426 can incrementally update the scene alignment based on the matrix multiplication. In some examples, the incremental correction 424 can be applied when the system is moving (and/or a motion of the system is above a threshold) to reduce and/or prevent a perceived effect of the correction applied. For example, the incremental correction 424 can be applied when the angular velocity ($\omega_{sb}$) measurement 404 and/or the linear velocity ($V_{sb}$) measurement 406 is/are high and/or above a threshold.

In some cases, the example alignment system 400 can apply pose corrections during loop closure events (e.g., when, after some movement, the system returns to a previous location and/or pose), map connection events (e.g., when different disconnected maps of a scene or merged and/or connected) and/or gravity correction events.

In some cases, the example alignment system 400 can apply pose corrections incrementally over time to reduce the negative impact of the corrections on the user experience. For example, pose corrections (e.g., corrections aligning a pose to a real-world coordinate system) can be applied instantaneously. However, applying a pose correction instantaneously (e.g., as opposed to gradually applying the pose correction over time or multiple frames) can, in some cases, negatively impact the user digital content experience.

To reduce the negative impact of the corrections on the user experience, the example alignment system 400 can apply pose corrections incrementally over time. The more gradual application of incremental corrections over time can prevent or reduce the visual artifacts perceived by the user when the corrections are applied.

In some cases, the alignment system 400 can analyze and/or consider one or more specific components of angular velocity ($\omega_{sb}$) and/or the overall alignment correction (and/or a component(s) thereof) to determine how to apply incremental corrections to make such corrections less noticeable to a user of the system. For example, an overall alignment correction can be decomposed to a correction in pitch and roll. The alignment system 400 can apply the roll correction when an angular velocity component in the roll dimension is significant (e.g., above a threshold, such as 10 radians per second, 20 radians per second, or other angular velocity threshold). The alignment system 400 can apply the pitch correction when the angular velocity component in the pitch dimension is significant (e.g., above a threshold, such as 10 radians per second, 20 radians per second, or other angular velocity threshold).

Figure 4B:
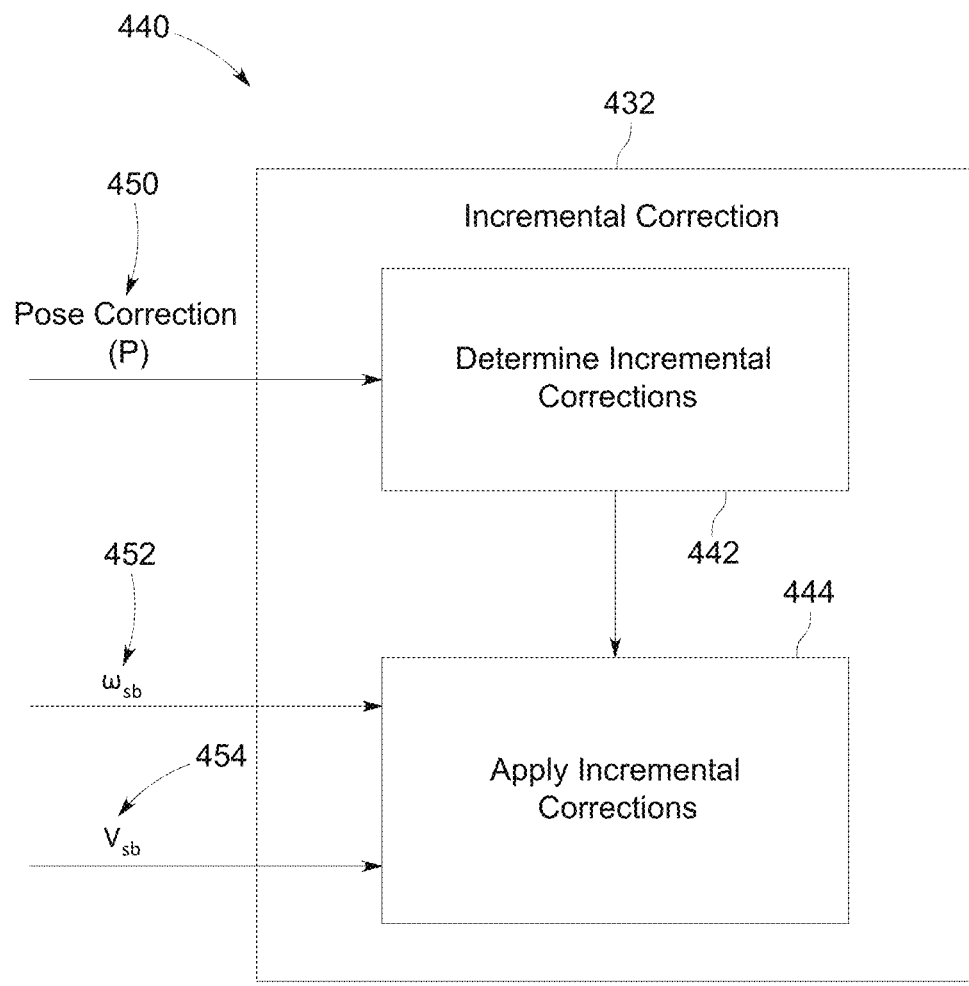
FIG. 4B is a diagram illustrating an example process for applying incremental alignment corrections to a scene, in accordance with some examples of the present disclosure.

FIG. 4B is a diagram illustrating an example process 440 for applying incremental alignment corrections to a scene (and/or associated virtual content). In this example, the incremental correction block 432 can use an estimated pose correction (P) 450 to determine incremental pose corrections at block 442. In some cases, the incremental correction block 432 can divide the estimated pose correction 450 into n number of incremental corrections. In some examples, the pose correction 450 can include an overall correction for aligning a pose of the system (e.g., image processing system 100) to a real-world coordinate system (e.g., to a gravity direction in the physical world).

At block 444, the incremental correction block 432 can then use an angular velocity ($\omega_{sb}$) measurement 452 and/or a linear velocity ($V_{sb}$) measurement 454 to apply the incremental pose corrections. The incremental correction block 432 can obtain the angular velocity ($\omega_{sb}$) measurement 452 and the linear velocity ($V_{sb}$) measurement 454 from the tracking filter 310, as previously described. In some examples, the incremental correction block 432 can use the angular velocity ($\omega_{sb}$) measurement 452 and the linear velocity ($V_{sb}$) measurement 454 to determine an amount of motion of the system. The incremental correction block 432 can use the amount of motion to determine when to apply an incremental pose correction.

For example, incremental correction block 432 can apply an incremental pose correction when a motion of the system is below a threshold (e.g., when the system is moving slower). The incremental correction block 432 can use the amount of motion determined from the angular velocity ($\omega_{sb}$) measurement 452 and the linear velocity ($V_{sb}$) measurement 454 to determine whether there is sufficient motion of the system to apply the incremental pose correction. When the incremental correction block 432 determines the motion of the system exceeds a threshold, the incremental correction block 432 can apply the incremental pose correction. In some cases, when the incremental correction block 432 determines the motion of the system does not exceed the threshold, the incremental correction block 432 can wait to apply the incremental pose correction when the motion of the system is above the threshold. By applying the incremental pose correction when the motion of the system is above the threshold, the incremental correction block 432 can prevent or reduce the visual artifacts perceived by the user when incremental pose corrections are applied.

In some examples, the incremental corrections applied by the example alignment system 400 shown in FIG. 4A and the example process 440 shown in FIG. 4B can include an axis angle correction. An axis angle correction can ensure that a correction is applied in a smooth and optimal manner (e.g., a manner that achieves alignment without or with limited visual artifacts). In some examples, the example alignment system 400 and the example process 440 can implement Algorithm 1 shown below.

---
Algorithm 1: Incremental Alignment Correction
--- if faster motion then
$\quad \vec{d}r = \log(R_{ys}^{new} * R_{ys}^{T})$;
$\quad \theta = \| \vec{d}r \|$;
$\quad$ if $\theta$ is significant then $\quad\quad \hat{n} = \dfrac{\vec{dr}}{\theta}$;

$\quad\quad \Delta R = \text{Exp}(\hat{n} * \Delta\theta_{step})$;
$\quad\quad R_{ys} = \Delta R * R_{ys}$;
$\quad$ else
$\quad\quad R_{ys} = R_{ys}^{new}$;
end

--- where $R_{ys}$ denotes current alignment information, $R_{ys}^{new}$ denotes a new alignment rotation from the gravity filter (e.g., gravity filter 312), dr denotes a delta rotation/angle, denotes an axis of rotation, $\theta_{step}$ denotes a fixed rotation angle, and $\Delta R$ denotes an incremental rotation to be applied to a current frame. In some cases, the Algorithm 1 can be used to compute smaller, incremental corrections from the delta rotation between a previously applied alignment matrix and a new alignment matrix.

The example alignment system 400 shown in FIG. 4A and the example process 440 shown in FIG. 4B can be implemented by one or more electronic devices. For example, the example alignment system 400 shown in FIG. 4A and the example process 440 shown in FIG. 4B can be implemented by an electronic device providing a digital content experience such as an XR experience. In some cases, the example alignment system 400 and the example process 440 can be implemented by the image processing system 100 shown in FIG. 1 and/or the XR device 202 shown in FIG. 2A and FIG. 2B.

In some cases, loop closure and map connection functionalities can help minimize tracking errors. When a loop closure is applied or different disconnected maps are merged, the user of the system (e.g., image processing system 100, XR device 202) can often see a jump in the scene rendered by the system. The systems and techniques described herein can implement loop closure and map connection functionalities and associated corrections. The systems and techniques described herein can implement such corrections in a manner that prevents or reduces the visual artifacts in the rendered scene, such as jumping of the rendered scene.

Figure 5A:
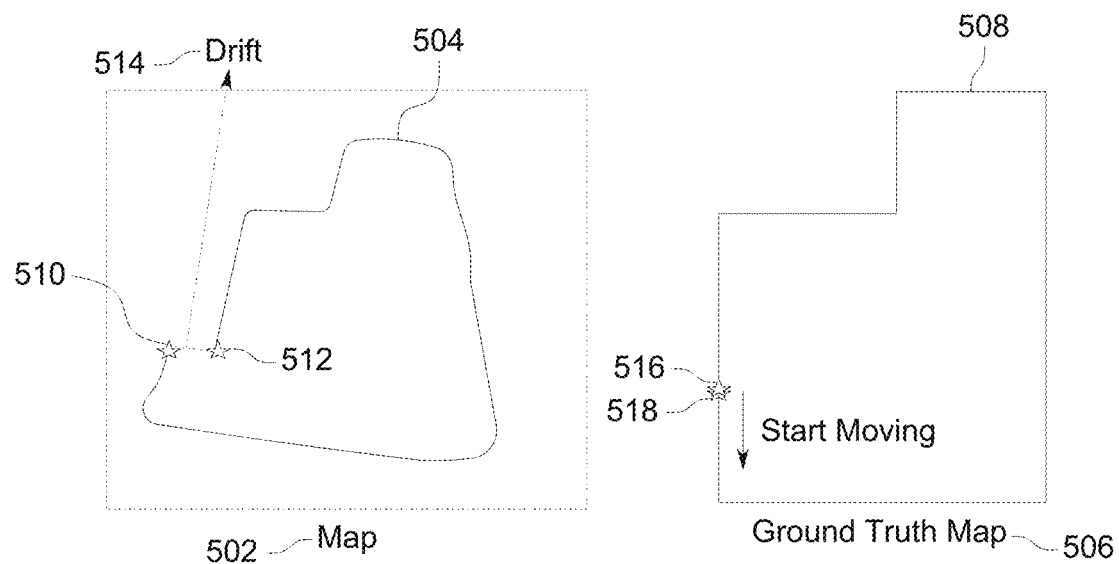
FIG. 5A is a diagram illustrating example representations of a loop closure event after movement of a system providing a digital content experience, in accordance with some examples of the present disclosure.

FIG. 5A is a diagram illustrating example representations of a loop closure event after movement of a system (e.g., image processing system 100, XR device 202) providing a digital content experience (e.g., XR experience and the like). In this example, the system includes a map 502 of a real-world scene. In some examples, the map 502 can provide a representation of the real-world scene as a set of three-dimensional (3D) landmarks or features that are projected to image coordinates. The map 502 can plot a path 504 traveled by the system from a starting position 510 to an ending position 512.

In many cases, measurements from sensors measuring movement of the system can drift, causing inaccuracies in the tracked state of the system. The map 502 illustrates a drift 514 between the starting position 510 and the ending position 512 in the path 504 traveled by the system. In some examples, the drift 514 can be caused by such tracking inaccuracies. The drift 514 can include an inaccuracy in the tracked location of the ending position 512 (and/or any other position along the path 504).

For example, a ground truth map 506 in FIG. 5A illustrates the actual path 508 traveled by the system, including the actual starting position 516 of the system and the actual ending position 518 of the system. In this example, the actual starting position 516 and the actual ending position 518 are aligned and/or overlapping. On the other hand, because of the drift 514 in the map 502, the starting position 510 and ending position 512 in the map 502 are not aligned and/or overlapping like the actual starting position 516 and the actual ending position 518 depicted in the ground truth map 506. Instead, the ending position 512 is a certain distance away from the starting position 510, and does not match (e.g., is not aligned with) the actual ending position 518 in the ground truth map 506.

To correct the tracking state depicted in the map 502, the system can apply a pose correction as described herein. The pose correction can be applied to correct the drift 514 reflected in the map 502. In some examples, the pose correction can include a pose jump that moves the location of the ending position 512 to correct the drift 514 and better match or align with the actual ending position 518 as shown in the ground truth map 506. In some cases, the pose jump can cause visual artifacts such as a jump in the rendered scene. The systems and techniques described herein can prevent or reduce the amount of visual artifacts, such as jump in the rendered scene, perceived by the user of the system when a pose jump is applied in loop closure and/or map connection events.

Figure 5B:
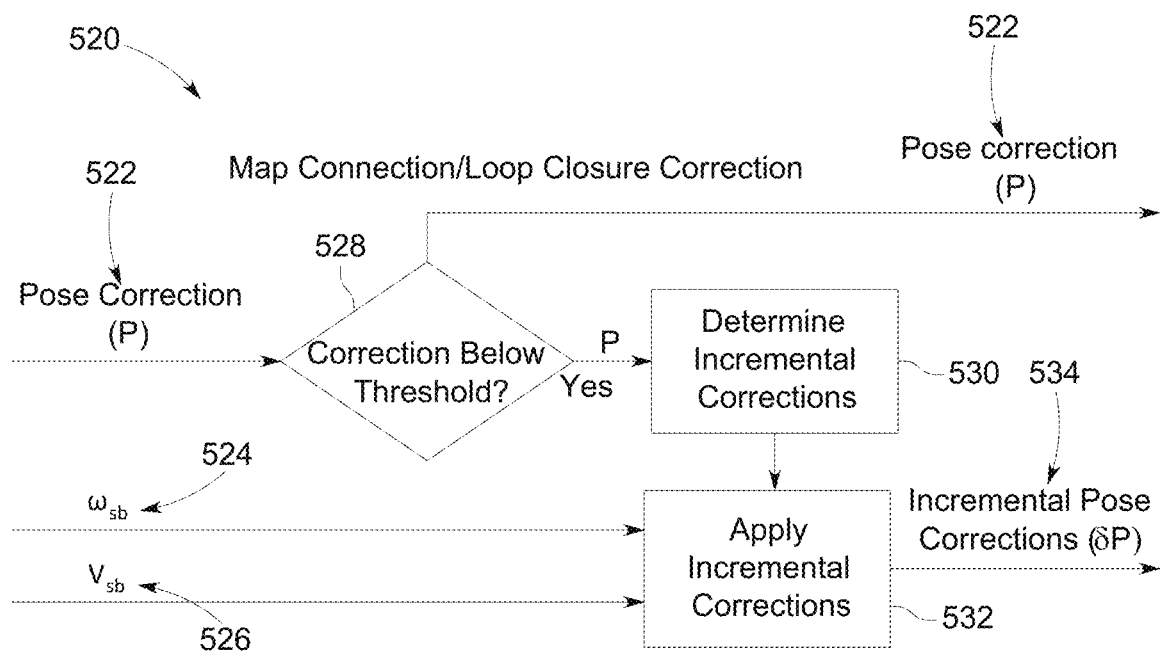
FIG. 5B is a diagram illustrating an example process for applying map connection corrections and/or loop closure corrections, in accordance with some examples of the present disclosure.

FIG. 5B is a diagram illustrating an example process 520 for applying map connection corrections and/or loop closure corrections. For example, the process 520 can apply pose corrections in loop closure and/or map connection events. When applying pose corrections, the process 520 can prevent and/or reduce visual artifacts in the scene, such as pose jumps. This can improve the user experience during loop closure and/or map connection events.

In some examples, the process 520 can be implemented by a gravity filter, such as gravity filter 312 shown in FIG. 3 and FIG. 4A. The process 520 can use an estimated pose correction (P) 522, an angular velocity ($\omega_{sb}$) measurement 524 and a linear velocity ($V_{sb}$) measurement 526 to determine how and/or when to apply a pose correction calculated. In some examples, the pose correction 522 can include a pose correction calculated by a tracking filter (e.g., tracking filter 310), as previously described. In other examples, the pose correction 522 can include a pose correction calculated by a gravity filter (e.g., gravity filter 312), as previously described. In some examples, the process 520 can obtain the angular velocity measurement 524 and/or the linear velocity measurement 526 from a tracking filter (e.g., tracking filter 310) and/or one or more sensors, such as one or more image sensors (e.g., image sensor 102, image sensor 104), inertial sensors (e.g., one or more other sensors 106), etc.

In this example, at block 528, the process 520 can use the pose correction 522 to determine whether the magnitude of the pose correction 522 is below a threshold. A determination that the magnitude of the pose correction 522 is below a threshold can indicate that the pose correction 522 is below a certain size. When the pose correction 522 is below the certain size, the process 520 can apply the pose correction 522 incrementally over a period of time and/or number of frames to better prevent or disguise visual artifacts from the pose correction 522. When the pose correction 522 is below the certain size, the process 520 can also apply the pose correction 522 incrementally over the period of time and/or number of frames while limiting a perceived lag in the pose correction and/or without (or with a lower likelihood of) the pose correction becoming outdated and/or increasingly inaccurate by the time the full correction is applied.

At block 530, if the pose correction 522 is below the threshold (e.g., if the pose correction 522 is smaller than a threshold), the process 520 can determine incremental corrections to apply to correct the pose in the rendered scene. In some examples, the process 520 can divide or segment the pose correction 522 into n number of smaller, incremental pose corrections. At block 532, the process 520 can then apply the incremental pose corrections ($\delta P$) 534 across a period of time and/or a number of frames. Here, the process 520 can apply the pose correction 522 more gradually as incremental pose corrections to prevent or reduce visual artifacts from the pose corrections, such as pose jumps.

The process 520 can apply the incremental pose corrections 534 until the full pose correction 522 has been applied. In some cases, the process 520 can apply the incremental pose corrections 534 when the system (e.g., image processing system 100, XR device 202) is moving faster than a threshold. For example, the process 520 can wait until the system is moving faster than a threshold to apply each incremental correction. By applying the incremental pose corrections 534 when the system is moving faster, the process 520 can prevent or reduce visual artifacts perceived by the user of the system. To illustrate, pose jumps caused by the incremental pose corrections 534 can be at least partly disguised and/or less noticeable to users when the system and the rendered scene are experiencing faster motion.

Returning to block 528, if the pose correction 522 is not below a threshold, the process 520 can apply the full pose correction 522 in a particular frame, such as a current frame. For example, in some cases, if the magnitude of the pose correction 522 is above a certain size, the process 520 may be less likely to prevent or disguise visual artifacts from the pose correction 522 by gradually applying incremental pose corrections until the full pose correction 522 is applied. As another example, if the magnitude of the pose correction 522 is above a certain size, to prevent or disguise visual artifacts from the pose correction 522 by applying the pose correction 522 gradually as incremental pose corrections, the process 520 may need to apply the incremental pose corrections over a longer period of time and/or a larger number of frames.

In some cases, the longer period of time and/or larger number of frames may cause a perceived lag in the pose correction and/or may delay the completion of the pose correction 522 sufficiently to negatively impact the user experience. For example, the pose correction 522 may become outdated and/or increasingly inaccurate over time. Thus, as the timeframe for applying the full pose correction 522 is extended, the likelihood that the pose correction 522 may become outdated and/or inaccurate by the time the full pose correction 522 is applied can increase, which can negatively impact the user's experience.

In some examples, the threshold size of the pose correction 522 can account for the amount and/or magnitude of visual artifacts in the scene when the pose correction 522 is applied incrementally, and/or the amount of time it would take to apply the full pose correction 522 incrementally. For example, the threshold can define an amount of pose correction that is too large to apply incrementally without a certain amount of degradation in the user experience (e.g., without a certain amount of visual artifacts, lag, etc.). If the size of the pose correction 522 is so large that the user may experience a certain amount/magnitude of visual artifacts such as scene jumps even if the pose correction 522 is applied gradually and incrementally, the process 520 may opt to apply the full pose correction quickly or instantaneously (e.g., across a single frame or a small number of frames) even if doing so may result in noticeable visual artifacts, since otherwise applying the pose correction 522 incrementally may still result in noticeable visual artifacts in addition to delaying the pose correction 522.

Figure 6A:
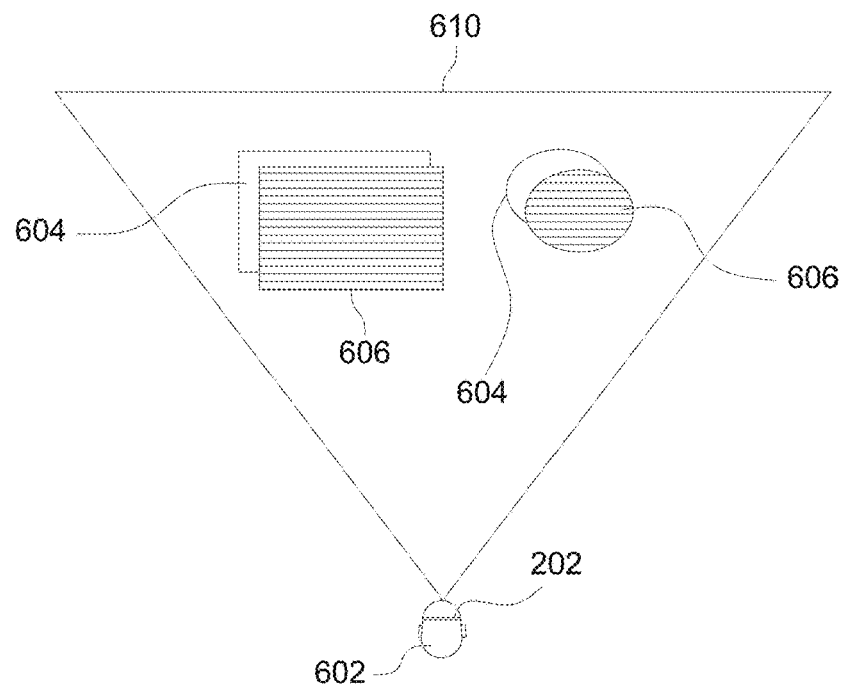
FIG. 6A and FIG. 6B are diagrams illustrating example extended reality (XR) map alignment corrections applied in an XR application, in accordance with some examples of the present disclosure.
Figure 6B:
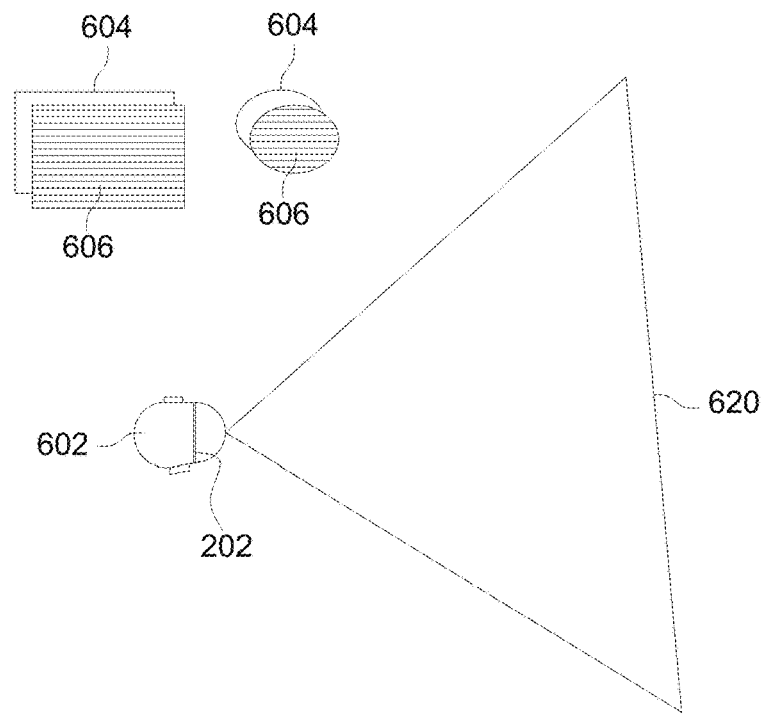

FIG. 6A and FIG. 6B are diagrams illustrating example XR map alignment corrections applied in an XR application, such as an augmented reality application. In many cases, a user of an XR application can perceive alignment corrections applied in the XR application. For example, when alignment corrections are applied in the XR application, the scene rendered by the XR application may experience a sudden jump, which can negatively impact the user's XR experience. To reduce or prevent the negative impact in the user's XR experience, in some examples, the system (e.g., image processing system 100, XR device 202) may apply the alignment corrections when the XR application is not presenting any virtual objects, when the XR application is presenting a limited number of virtual objects (e.g., less than a threshold number of virtual objects), and/or when the user of the system is not viewing any virtual objects (e.g., when virtual objects are outside of the field-of-view of the user).

For example, in FIG. 6A, virtual content 604 and virtual content 606 are within a field-of-view (FOV) 610 of a user 602 wearing an XR device 202 running an XR application. In this example, the virtual content 604 represents digital content before alignment correction is applied, and the virtual content 606 represents digital content after alignment correction is applied. Since the virtual content 604 and the virtual content 606 are within the FOV 610 of the user 602, the user 602 can see the virtual content 604 before the alignment correction is applied and the virtual content 606 after the alignment correction is applied. Thus, the user 602 may perceive and/or experience visual artifacts, such as a scene jump, when the alignment correction is applied while the virtual content is within the FOV 610 of the user 602.

By contrast, in FIG. 6B, the virtual content 604 and virtual content 606 are not within a FOV 620 of the user 602 wearing the XR device 202. Since the virtual content 604 and the virtual content 606 are not within the FOV 620 of the user 602, the user 602 may not see the virtual content 604 before the alignment correction is applied and the virtual content 606 after the alignment correction is applied. Thus, the user 602 may not perceive and/or experience any visual artifacts that may occur when the alignment correction is applied while the virtual content is not within the FOV 620 of the user 602. Accordingly, in some cases, to reduce or prevent a negative impact in the user's XR experience when alignment corrections are applied, the XR device 202 can apply alignment corrections when the virtual content is not within a FOV of the user 602.

Figure 7:
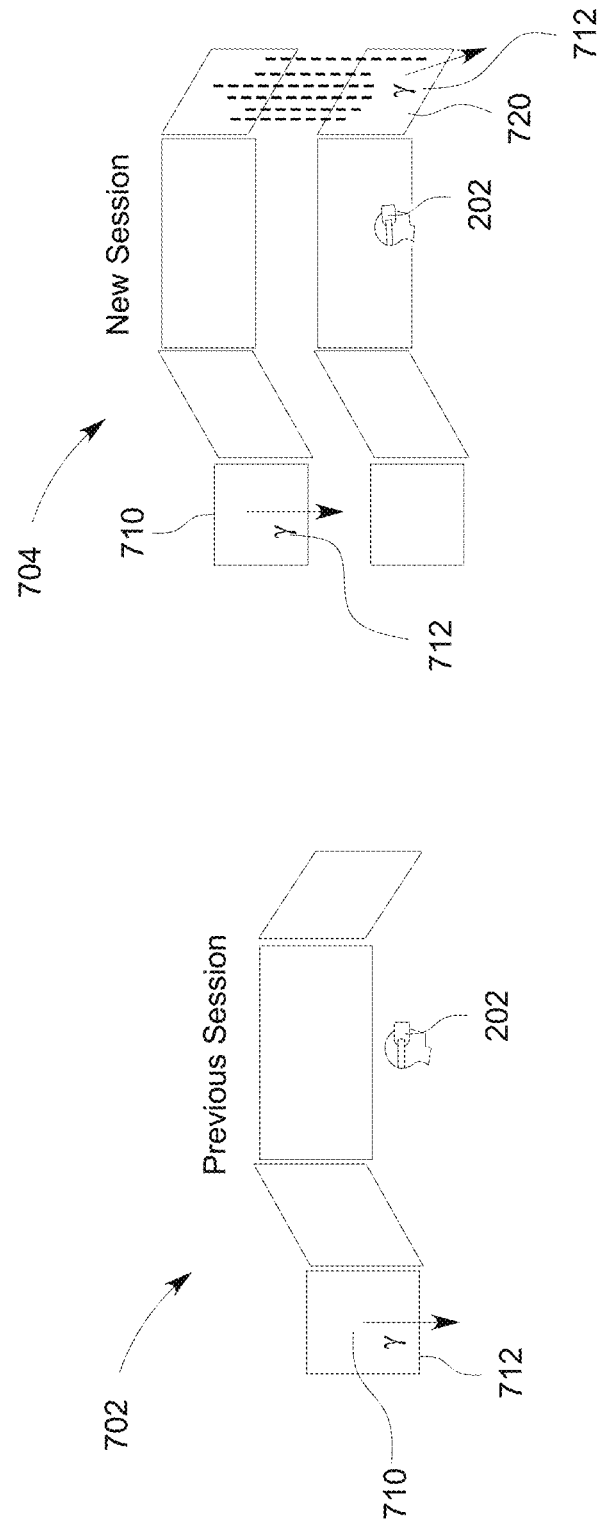
FIG. 7 is a diagram illustrating an example of a gravity estimate and a mapped scene from a content session being saved and re-used for a different content session, in accordance with some examples of the present disclosure.

FIG. 7 is a diagram illustrating an example of a gravity estimate and a mapped scene from a content session being saved and re-used for a different content session. As shown, a mapped scene from a session 702 can be saved as a point cloud 710. In some examples, the point cloud 710 can represent a simultaneous localization and mapping (SLAM) map of the scene. In some cases, the point cloud 710 can be saved with a gravity vector(s) associated with the SLAM map.

The mapped scene (e.g., the point cloud 710) can be aligned with a gravity direction ($\gamma$) 712 in a real-world coordinate system. In some cases, a point cloud of a fixed structure, such as an indoor structure, can have a fixed relation to the gravity direction 712 in the real-world coordinate system. In some examples, the estimated gravity direction 712 can have a fixed relation with a SLAM map of the scene.

The XR device 202 can save the point cloud 710 from the session 702 and an associated gravity vector(s) for a different session 704. The XR device 202 can use the saved point cloud 710 and associated gravity vector from the session 702 to generate an initial point cloud 720 for the different session 704. In some cases, the initial point cloud 720 can include a partial point cloud initialized with the gravity vector saved from the session 702. For example, the XR device 202 can obtain the gravity estimate for the different session 704 from the saved point cloud 710 of the session 702 to avoid estimating a new gravity estimate from start.

In some examples, the XR device 202 can load a static map of the scene. Once the XR device 202 has loaded the static map of the scene, the XR device 202 can perform feature matching to register a previous dense map (e.g., the point cloud 710 from the session 702) to the initial point cloud 720 for the different session 704 (e.g., the partial map for the different session 704). The initial point cloud 720 for the different session 704 can be gravity-aligned from initialization (e.g., at the start) using the saved gravity. Thus, rather than correcting a gravity alignment after the point cloud for the different session 704 has been initialized when the XR device 202 experiences a certain amount of motion, the XR device 202 can start the different session 704 with a gravity-aligned point cloud. In some cases, using the previously saved gravity vector can significantly help reduce a degree of tilt in the horizon (e.g., tilt relative to the gravity direction) from the start, including a moving start which can cause greater misalignment.

In some examples, the XR device 202 can store different gravity vectors from different sessions in different scenes. When the XR device 202 moves across different scenes, the XR device 202 can register different saved maps. In some cases, after registering a map, the XR device 202 can re-initialize the registered map with a gravity vector from a new or current scene. When the XR device 202 moves to a different space, the XR device 202 can apply a corresponding gravity vector to gravity-align the rendered scene in the different space. In some examples, different maps may have different gravity vectors. In some cases, some or all of the gravity vectors may have one or more differences. For example, some or all of the gravity vectors may not be identical and instead may be slightly different.

In some cases, the XR device 202 can use machine learning to determine whether the XR device 202 is in a moving platform (e.g., a boat, a plane, an elevator, a car, etc.) and/or a type of moving platform, in order to determine whether to reuse a saved map and/or gravity vector, or generate a new map and/or gravity vector. For example, the XR device 202 can implement one or more neural networks to detect whether the XR device 202 is in a moving platform and/or a type of moving platform. The XR device 202 can determine whether to use a saved map and/or gravity vector for a new session in the moving platform. In some cases, the XR device 202 may determine not to use a saved map and/or gravity vector when the XR device 202 is in a moving platform or a specific type of moving platform (e.g., a moving platform estimated to experience more motion, more frequent motion, and/or motion above a threshold). The XR device 202 may determine to instead generate a new map and/or gravity vector for the moving platform to avoid larger alignment errors from the motion and/or state variations experienced in the moving platform.

Figure 8:
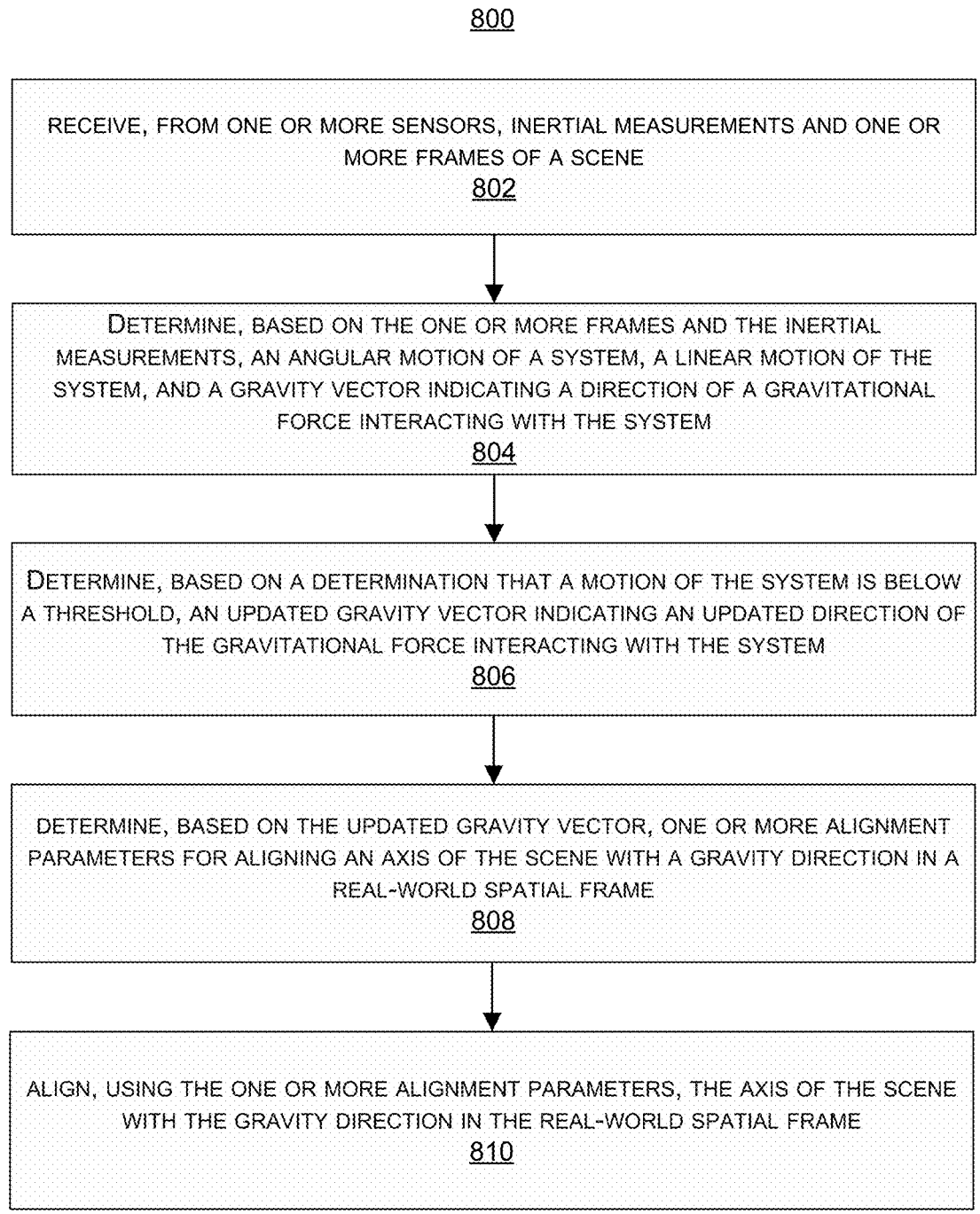
FIG. 8 is a flowchart illustrating an example process for determining and applying corrected poses in digital content experiences, in accordance with some examples of the present disclosure.

FIG. 8 is a flowchart illustrating an example process 800 for determining and applying corrected poses in digital content experiences, such as XR experiences. In some cases, applying corrected poses in digital content experiences can include applying corrected poses to a scene in a digital content experience, virtual content associated with the scene, and/or a map of the scene representing the scene and 3D landmarks/features in the scene. In some cases, applying corrected poses in digital content experiences can include aligning a map of a scene, such as a SLAM map, to a gravity direction in the real/physical world.

At block 802, the process 800 can include receiving, from one or more sensors (e.g., image sensor 102, image sensor 104, one or more other sensors 106) associated with a system (e.g., image processing system 100, XR device 202), inertial measurements (e.g., input measurements 302) and one or more frames (e.g., input frame 304) capturing a scene.

At block 804, the process 800 can include determining, based on the one or more frames and the inertial measurements, an angular motion of the system, a linear motion of the system, and a gravity vector (e.g., gravity estimate (γ) 322) indicating a direction of a gravitational force interacting with the system. In some cases, the angular motion of the system, the linear motion of the system, and the gravity vector can be determined using a first filter (e.g., tracking filter 310). In some cases, the gravity vector can be determined when the system is static or substantially static.

At block 806, the process 800 can include determining, based on a determination that a motion of the system is below a threshold, an updated gravity vector (e.g., new gravity estimate (γ̄) 412) indicating an updated direction of the gravitational force interacting with the system. In some cases, the updated gravity vector can be determined using a second filter (e.g., gravity filter 312). In some cases, the updated gravity vector can be determined when the system is static or substantially static.

At block 808, the process 800 can include determining, based on the updated gravity vector, one or more alignment parameters (e.g., rotation estimate ($R_{\gamma s}$) 324, rotation matrix ($R_{\bar{\gamma} s}$) 418, delta rotation ($R_{\bar{\gamma} \gamma}$) 422) for aligning an axis (e.g., a vertical axis, a horizontal axis, and/or a depth axis) of the scene with a gravity direction (e.g., gravity direction 204) in a real-world spatial frame (e.g., a real-world coordinate system in physical space).

In some examples, the one or more alignment parameters can include one or more rotation parameters (e.g., a rotation estimate and/or matrix) identifying a rotation of the scene from a current pose to a gravity-aligned pose (e.g., gravity-aligned pose ($P_{\gamma b}$) 326) and/or one or more translation parameters identifying a translation of the scene from a current pose to a gravity-aligned pose. In some cases, the gravity-aligned pose can be aligned with the gravity direction in the real-world spatial frame.

In some cases, the one or more alignment parameters can describe a rotation of the scene and/or one or more virtual content items rendered in the scene from a current pose to a gravity-aligned pose (e.g., gravity-aligned pose ($P_{\gamma b}$) 326).

At block 810, the process 800 can include aligning, using the parameters, the axis of the scene with the gravity direction in the real-world spatial frame. In some examples, aligning the axis of the scene with the gravity direction can include aligning a horizon of the scene and/or virtual content rendered in the scene to the gravity direction in the real-world spatial frame. In some cases, aligning the axis of the scene with the gravity direction can include determining a gravity-aligned pose (e.g., gravity-aligned pose ($P_{\gamma b}$) 326), and aligning the scene (and/or virtual content in the scene) according to the gravity-aligned pose.

In some cases, determining the one or more alignment parameters can include determining that a magnitude of an alignment correction associated with the one or more alignment parameters exceeds a threshold, and dividing the alignment correction into a plurality of incremental alignment corrections (e.g., incremental correction ($\delta R_{\bar{\gamma} \gamma}$) 424, the incremental pose corrections (δP) 534). For example, the process 800 can divide the alignment correction into the plurality of incremental corrections when the magnitude of the alignment correction exceeds the threshold.

In some examples, aligning the axis of the scene with the gravity direction in the real-world spatial frame can include applying the plurality of incremental alignment corrections across a plurality of frames capturing the scene. In some cases, applying the plurality of incremental alignment corrections across a plurality of frames capturing the scene can include applying an incremental alignment correction (e.g., incremental correction ($\delta R_{\bar{\gamma} \gamma}$) 424) of the plurality of incremental alignment corrections to a current frame of the plurality of frames, and applying each additional incremental alignment correction in the plurality of incremental alignment corrections to a different respective frame from the plurality of frames.

In some examples, aligning the axis of the scene with the gravity direction in the real-world spatial frame can include determining, based on the angular motion of the system and/or the linear motion of the system, that a motion of the system exceeds a threshold and, based on the motion of the system exceeding the threshold, applying the plurality of incremental alignment corrections across a plurality of frames capturing the scene.

In some cases, dividing the alignment correction into the plurality of incremental alignment corrections can include determining a difference between the one or more alignment parameters (e.g., rotation matrix ($R_{\bar{\gamma} s}$) 418) and one or more additional alignment parameters (e.g., previous rotation matrix ($R_{\gamma s}$) 420) previously used to align the axis of the scene with the gravity direction in the real-world spatial frame and, based on a determination that the difference between the one or more alignment parameters and the one or more additional alignment parameters exceeds a threshold, dividing the alignment correction into the plurality of incremental alignment corrections. For example, the process 800 can divide the alignment correction into the plurality of incremental alignment corrections when the difference between the one or more alignment parameters and the one or more additional alignment parameters exceeds a threshold (e.g., when a magnitude of a delta of the corrections associated with the one or more alignment parameters is larger than a threshold magnitude or delta).

In some aspects, the process 800 can include generating a map of the scene (e.g., point cloud 710) and storing the map of the scene and the updated gravity vector associated with the scene. In some examples, the map of the scene can include a set of three-dimensional (3D) landmarks (e.g., features) in the scene projected from the real-world spatial frame to frame coordinates. In some cases, the map of the scene can include SLAM map.

In some aspects, the process 800 can include initiating a new extended reality session (e.g., different session 704) associated with the scene; based on the stored map of the scene and updated gravity vector; loading an initial map (e.g., initial point cloud 720) of the scene for the new extended reality session; registering the stored map of the scene to the initial map of the scene; and aligning, using the updated gravity vector, the registered map of the scene with the gravity direction in the real-world spatial frame.

In some aspects, the process 800 can include generating SLAM maps of a plurality of scenes, storing the SLAM maps and associated gravity vectors, and based on a determination that the system has moved from a current scene associated with a first SLAM map of the SLAM maps to a different scene associated with a second SLAM map of the SLAM maps, initializing a gravity-aligned SLAM map using the second SLAM map and an associated gravity vector.

In some aspects, the process 800 can include rendering one or more virtual content items in the scene. In some examples, the one or more virtual content items can be aligned with the gravity direction in the real-world spatial frame based on the alignment of the axis of the scene with the gravity direction.

In some examples, the processes described herein (e.g., processes 300, 440, 520, 800, and/or any other process described herein) may be performed by a computing device or apparatus. In one example, the process 800 can be performed by the image processing system 100 of FIG. 1. In another example, the process 800 can be performed by the XR device 202 of FIG. 2A and FIG. 2B. In another example, the process 800 can be performed by the computing system having the computing device architecture 900 shown in FIG. 9. For instance, a computing device with the computing device architecture 900 shown in FIG. 9 can implement the operations of FIG. 8 and/or the components and/or operations described herein with respect to any of FIG. 1-FIG. 8.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a laptop computer, a smart television, a camera, and/or any other computing device with the resource capabilities to perform the processes described herein, including the processes 300, 440, 520, 800, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 300, 440, 520, 800 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 300, 440, 520, 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
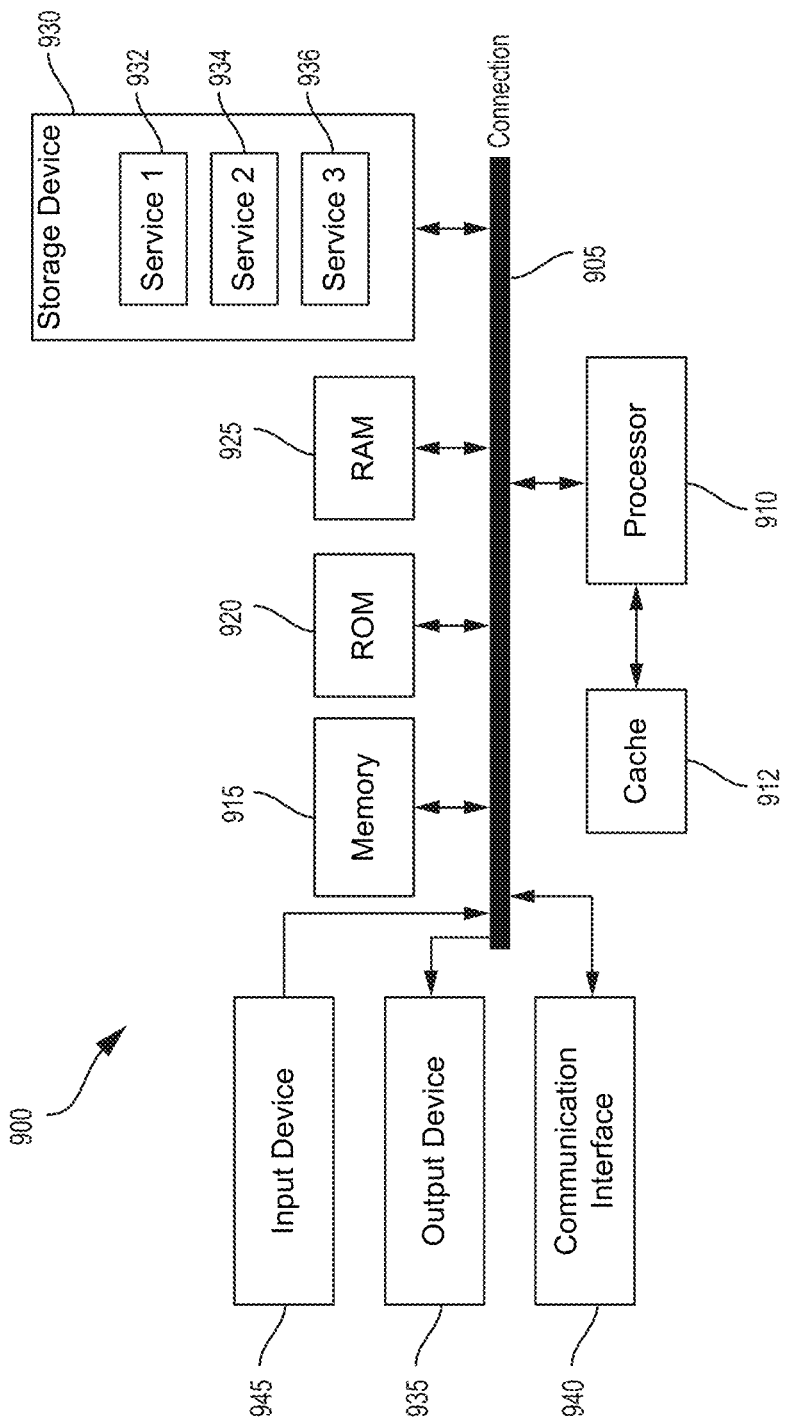
FIG. 9 is a diagram illustrating an example system architecture for implementing certain aspects described herein.

FIG. 9 illustrates an example computing device architecture 900 of an example computing device which can implement various techniques described herein. For example, the computing device architecture 900 can implement at least some portions of the image processing system 100 shown in FIG. 1. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service (e.g., service 1 932, service 2 934, and service 3 936) stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include service 932, service 934, and service 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: An apparatus comprising: memory; and one or more processors coupled to the memory, the one or more processors being configured to: receive, from one or more sensors associated with the apparatus, inertial measurements and one or more frames of a scene; determine, based on the one or more frames and the inertial measurements, an angular motion of the apparatus, a linear motion of the apparatus, and a gravity vector indicating a direction of a gravitational force interacting with the apparatus; determine, based on a determination that a motion of the apparatus is below a threshold, an updated gravity vector indicating an updated direction of the gravitational force interacting with the apparatus; determine, based on the updated gravity vector, one or more alignment parameters for aligning an axis of the scene with a gravity direction in a real-world spatial frame, the gravity direction corresponding to the updated direction of the gravitational force interacting with the apparatus; and align, using the one or more alignment parameters, the axis of the scene with the gravity direction in the real-world spatial frame.

Aspect 2: The apparatus of Aspect 1, wherein the one or more alignment parameters comprise one or more rotation parameters identifying a rotation of the scene from a current pose to a gravity-aligned pose, the gravity-aligned pose being aligned with the gravity direction in the real-world spatial frame.

Aspect 3: The apparatus of any of Aspects 1 to 2, wherein the one or more alignment parameters comprise one or more translation parameters identifying a translation of the scene from a current pose to a gravity-aligned pose, the gravity-aligned pose being aligned with the gravity direction in the real-world spatial frame.

Aspect 4: The apparatus of any of Aspects 1 to 3, wherein, to determine the one or more alignment parameters, the one or more processors are configured to: determine that a magnitude of an alignment correction associated with the one or more alignment parameters exceeds a threshold; and divide the alignment correction into a plurality of incremental alignment corrections.

Aspect 5: The apparatus of Aspect 4, wherein, to align the axis of the scene with the gravity direction in the real-world spatial frame, the one or more processors are configured to: apply the plurality of incremental alignment corrections across a plurality of frames capturing the scene.

Aspect 6: The apparatus of Aspect 5, wherein, to apply the plurality of incremental alignment corrections across the plurality of frames, the one or more processors are configured to: apply an incremental alignment correction of the plurality of incremental alignment corrections to a current frame of the plurality of frames; and apply each additional incremental alignment correction in the plurality of incremental alignment corrections to a different respective frame from the plurality of frames.

Aspect 7: The apparatus of Aspect 4, wherein, to align the axis of the scene with the gravity direction in the real-world spatial frame, the one or more processors are configured to: determine, based on at least one of the angular motion of the apparatus and the linear motion of the apparatus, that a motion of the apparatus exceeds a threshold; and based on the motion of the apparatus exceeding the threshold, apply the plurality of incremental alignment corrections across a plurality of frames capturing the scene.

Aspect 8: The apparatus of Aspect 4, wherein, to divide the alignment correction into the plurality of incremental alignment corrections, the one or more processors are configured to: determine a difference between the one or more alignment parameters and one or more additional alignment parameters previously used to align the axis of the scene with the gravity direction in the real-world spatial frame; and based on a determination that the difference between the one or more alignment parameters and the one or more additional alignment parameters exceeds a threshold, divide the alignment correction into the plurality of incremental alignment corrections.

Aspect 9: The apparatus of any of Aspects 1 to 8, wherein the one or more alignment parameters describe a rotation of at least one of the scene and one or more virtual content items rendered in the scene from a current pose to a gravity-aligned pose, the gravity-aligned pose being aligned with the gravity direction in the real-world spatial frame.

Aspect 10: The apparatus of any of Aspects 1 to 9, wherein the one or more processors are configured to: generate a map of the scene, the map of the scene comprising a set of three-dimensional (3D) landmarks in the scene projected from the real-world spatial frame to frame coordinates; and store the map of the scene and the updated gravity vector associated with the scene.

Aspect 11: The apparatus of Aspect 10, wherein the map of the scene comprises a simultaneous localization and mapping (SLAM) map.

Aspect 12: The apparatus of any of Aspects 10 to 11, wherein the one or more processors are configured to: initiate a new extended reality session associated with the scene; based on the stored map of the scene and updated gravity vector, load an initial map of the scene for the new extended reality session; register the stored map of the scene to the initial map of the scene; and align, using the updated gravity vector, the registered map of the scene with the gravity direction in the real-world spatial frame.

Aspect 13: The apparatus of any of Aspects 1 to 12, wherein the one or more processors are configured to: generate SLAM maps of a plurality of scenes; store the SLAM maps and associated gravity vectors; and based on a determination that the apparatus has moved from a current scene associated with a first SLAM map of the SLAM maps to a different scene associated with a second SLAM map of the SLAM maps, initialize a gravity-aligned SLAM map using the second SLAM map and an associated gravity vector.

Aspect 14: The apparatus of any of Aspects 1 to 13, wherein the one or more processors are configured to: render one or more virtual content items in the scene, the one or more virtual content items being aligned with the gravity direction in the real-world spatial frame based on the aligning of the axis of the scene with the gravity direction.

Aspect 15: The apparatus of any of Aspects 1 to 14, wherein the apparatus comprises a camera device.

Aspect 16: The apparatus of any of Aspects 1 to 15, wherein the apparatus comprises a mobile device.

Aspect 17: The apparatus of any of Aspects 1 to 16, wherein the apparatus comprises an extended reality (XR) device, and wherein the one or more sensors comprises at least one of an image sensor, a gyroscope, and an accelerometer.

Aspect 18: A method comprising: receiving, from one or more sensors associated with a device, inertial measurements and one or more frames of a scene; determining, based on the one or more frames and the inertial measurements, an angular motion of the device, a linear motion of the device, and a gravity vector indicating a direction of a gravitational force interacting with the device; determining, based on a determination that a motion of the device is below a threshold, an updated gravity vector indicating an updated direction of the gravitational force interacting with the device; determining, based on the updated gravity vector, one or more alignment parameters for aligning an axis of the scene with a gravity direction in a real-world spatial frame, the gravity direction corresponding to the updated direction of the gravitational force interacting with the device; and aligning, using the one or more alignment parameters, the axis of the scene with the gravity direction in the real-world spatial frame.

Aspect 19: The method of Aspect 18, wherein the one or more alignment parameters comprise one or more rotation parameters identifying a rotation of the scene from a current pose to a gravity-aligned pose, the gravity-aligned pose being aligned with the gravity direction in the real-world spatial frame.

Aspect 20: The method of any of Aspects 18 to 19, wherein the one or more alignment parameters comprise one or more translation parameters identifying a translation of the scene from a current pose to a gravity-aligned pose, the gravity-aligned pose being aligned with the gravity direction in the real-world spatial frame.

Aspect 21: The method of any of Aspects 18 to 20, wherein determining the one or more alignment parameters comprises: determining that a magnitude of an alignment correction associated with the one or more alignment parameters exceeds a threshold; and dividing the alignment correction into a plurality of incremental alignment corrections.

Aspect 22: The method of Aspect 21, wherein aligning the axis of the scene with the gravity direction in the real-world spatial frame comprises: applying the plurality of incremental alignment corrections across a plurality of frames capturing the scene.

Aspect 23: The method of Aspect 22, wherein applying the plurality of incremental alignment corrections across the plurality of frames comprises: applying an incremental alignment correction of the plurality of incremental alignment corrections to a current frame of the plurality of frames; and applying each additional incremental alignment correction in the plurality of incremental alignment corrections to a different respective frame from the plurality of frames.

Aspect 24: The method of Aspect 21, wherein aligning the axis of the scene with the gravity direction in the real-world spatial frame comprises: determining, based on at least one of the angular motion of the device and the linear motion of the device, that a motion of the device exceeds a threshold; and based on the motion of the device exceeding the threshold, applying the plurality of incremental alignment corrections across a plurality of frames capturing the scene.

Aspect 25: The method of Aspect 21, wherein dividing the alignment correction into the plurality of incremental alignment corrections comprises: determining a difference between the one or more alignment parameters and one or more additional alignment parameters previously used to align the axis of the scene with the gravity direction in the real-world spatial frame; and based on a determination that the difference between the one or more alignment parameters and the one or more additional alignment parameters exceeds a threshold, dividing the alignment correction into the plurality of incremental alignment corrections.

Aspect 26: The method of any of Aspects 18 to 25, wherein the one or more alignment parameters describe a rotation of at least one of the scene and one or more virtual content items rendered in the scene from a current pose to a gravity-aligned pose, the gravity-aligned pose being aligned with the gravity direction in the real-world spatial frame.

Aspect 27: The method of any of Aspects 18 to 26, further comprising: generating a map of the scene, the map of the scene comprising a set of three-dimensional (3D) landmarks in the scene projected from the real-world spatial frame to frame coordinates; and storing the map of the scene and the updated gravity vector associated with the scene.

Aspect 28: The method of Aspect 27, wherein the map of the scene comprises a simultaneous localization and mapping (SLAM) map.

Aspect 29: The method of any of Aspects 27 to 28, further comprising: initiating a new extended reality session associated with the scene; based on the stored map of the scene and updated gravity vector, loading an initial map of the scene for the new extended reality session; registering the stored map of the scene to the initial map of the scene; and aligning, using the updated gravity vector, the registered map of the scene with the gravity direction in the real-world spatial frame.

Aspect 30: The method of any of Aspects 18 to 29, further comprising: generating SLAM maps of a plurality of scenes; storing the SLAM maps and associated gravity vectors; and based on a determination that the device has moved from a current scene associated with a first SLAM map of the SLAM maps to a different scene associated with a second SLAM map of the SLAM maps, initializing a gravity-aligned SLAM map using the second SLAM map and an associated gravity vector.

Aspect 31: The method of any of Aspects 18 to 30, further comprising: rendering one or more virtual content items in the scene, the one or more virtual content items being aligned with the gravity direction in the real-world spatial frame based on the aligning of the axis of the scene with the gravity direction.

Aspect 32: A non-transitory computer-readable medium having stored thereon instructions that, when executed by one or more processors, cause the one or more processors to perform a method according to any of Aspects 18 to 31.

Aspect 33: An apparatus comprising means for performing a method according to any of Aspects 18 to 31.

What is claimed is:

1. A apparatus comprising:
   memory; and
   one or more processors coupled to the memory, the one or more processors being configured to:
   receive, from one or more sensors associated with the apparatus, inertial measurements and one or more frames of a scene;
   determine, based on the one or more frames and the inertial measurements, an angular motion of the apparatus, a linear motion of the apparatus, and a gravity vector indicating a direction of a gravitational force interacting with the apparatus, wherein the gravity vector is determined when the apparatus is static;
   determine, based on a determination that a motion of the apparatus is below a threshold, an updated gravity vector indicating an updated direction of the gravitational force interacting with the apparatus;
   determine, based on the updated gravity vector, one or more alignment parameters for aligning an axis of the scene with a gravity direction in a real-world spatial frame, the gravity direction corresponding to the updated direction of the gravitational force interacting with the apparatus, wherein the one or more alignment parameters are determined by configuring the one or more processors to:
      determine that a magnitude of an alignment correction associated with the one or more alignment parameters exceeds a threshold; and
      divide the alignment correction into a plurality of incremental alignment corrections; and
   align, using the one or more alignment parameters, the axis of the scene with the gravity direction in the real-world spatial frame.

2. The apparatus of claim 1, wherein the one or more alignment parameters comprise one or more rotation parameters identifying a rotation of the scene from a current pose to a gravity-aligned pose, the gravity-aligned pose being aligned with the gravity direction in the real-world spatial frame.

3. The apparatus of claim 1, wherein the one or more alignment parameters comprise one or more translation parameters identifying a translation of the scene from a current pose to a gravity-aligned pose, the gravity-aligned pose being aligned with the gravity direction in the real-world spatial frame.

4. The apparatus of claim 1, wherein, to align the axis of the scene with the gravity direction in the real-world spatial frame, the one or more processors are configured to:
apply the plurality of incremental alignment corrections across a plurality of frames capturing the scene.

5. The apparatus of claim 4, wherein, to apply the plurality of incremental alignment corrections across the plurality of frames, the one or more processors are configured to:
apply an incremental alignment correction of the plurality of incremental alignment corrections to a current frame of the plurality of frames; and
apply each additional incremental alignment correction in the plurality of incremental alignment corrections to a different respective frame from the plurality of frames.

6. The apparatus of claim 1, wherein, to align the axis of the scene with the gravity direction in the real-world spatial frame, the one or more processors are configured to:
determine, based on at least one of the angular motion of the apparatus and the linear motion of the apparatus, that a motion of the apparatus exceeds a threshold; and
based on the motion of the apparatus exceeding the threshold, apply the plurality of incremental alignment corrections across a plurality of frames capturing the scene.

7. The apparatus of claim 1, wherein, to divide the alignment correction into the plurality of incremental alignment corrections, the one or more processors are configured to:
determine a difference between the one or more alignment parameters and one or more additional alignment parameters previously used to align the axis of the scene with the gravity direction in the real-world spatial frame; and
based on a determination that the difference between the one or more alignment parameters and the one or more additional alignment parameters exceeds a threshold, divide the alignment correction into the plurality of incremental alignment corrections.

8. The apparatus of claim 1, wherein the one or more alignment parameters describe a rotation of at least one of the scene and one or more virtual content items rendered in the scene from a current pose to a gravity-aligned pose, the gravity-aligned pose being aligned with the gravity direction in the real-world spatial frame.

9. The apparatus of claim 1, wherein the one or more processors are configured to:
generate a map of the scene, the map of the scene comprising a set of three-dimensional (3D) landmarks in the scene projected from the real-world spatial frame to frame coordinates; and
store the map of the scene and the updated gravity vector associated with the scene.

10. The apparatus of claim 9, wherein the map of the scene comprises a simultaneous localization and mapping (SLAM) map.

11. The apparatus of claim 9, wherein the one or more processors are configured to:
initiate a new extended reality session associated with the scene;
based on the stored map of the scene and updated gravity vector, load an initial map of the scene for the new extended reality session;
register the stored map of the scene to the initial map of the scene; and
align, using the updated gravity vector, the registered map of the scene with the gravity direction in the real-world spatial frame.

12. The apparatus of claim 1, wherein the one or more processors are configured to:
generate SLAM maps of a plurality of scenes;
store the SLAM maps and associated gravity vectors; and
based on a determination that the apparatus has moved from a current scene associated with a first SLAM map of the SLAM maps to a different scene associated with a second SLAM map of the SLAM maps, initialize a gravity-aligned SLAM map using the second SLAM map and an associated gravity vector.

13. The apparatus of claim 1, wherein the one or more processors are configured to:
render one or more virtual content items in the scene, the one or more virtual content items being aligned with the gravity direction in the real-world spatial frame based on the aligning of the axis of the scene with the gravity direction.

14. The apparatus of claim 1, wherein the apparatus comprises a camera device.

15. The apparatus of claim 1, wherein the apparatus comprises a mobile device.

16. The apparatus of claim 1, wherein the apparatus comprises an extended reality (XR) device, and wherein the one or more sensors comprises at least one of an image sensor, a gyroscope, and an accelerometer.

17. A method comprising:
receiving, from one or more sensors associated with a device, inertial measurements and one or more frames of a scene;
determining, based on the one or more frames and the inertial measurements, an angular motion of the device, a linear motion of the device, and a gravity vector indicating a direction of a gravitational force interacting with the device, wherein the gravity vector is determined when the device is static;
determining, based on a determination that a motion of the device is below a threshold, an updated gravity vector indicating an updated direction of the gravitational force interacting with the device;
determining, based on the updated gravity vector, one or more alignment parameters for aligning an axis of the scene with a gravity direction in a real-world spatial frame, the gravity direction corresponding to the updated direction of the gravitational force interacting with the device, wherein determining the one or more alignment parameters comprises:
determining that a magnitude of an alignment correction associated with the one or more alignment parameters exceeds a threshold; and
dividing the alignment correction into a plurality of incremental alignment corrections; and
aligning, using the one or more alignment parameters, the axis of the scene with the gravity direction in the real-world spatial frame.

18. The method of claim 17, wherein the one or more alignment parameters comprise one or more rotation parameters identifying a rotation of the scene from a current pose to a gravity-aligned pose, the gravity-aligned pose being aligned with the gravity direction in the real-world spatial frame.

19. The method of claim 17, wherein the one or more alignment parameters comprise one or more translation parameters identifying a translation of the scene from a current pose to a gravity-aligned pose, the gravity-aligned pose being aligned with the gravity direction in the real-world spatial frame.

20. The method of claim 17, wherein aligning the axis of the scene with the gravity direction in the real-world spatial frame comprises:
applying the plurality of incremental alignment corrections across a plurality of frames capturing the scene.

21. The method of claim 20, wherein applying the plurality of incremental alignment corrections across the plurality of frames comprises:
applying an incremental alignment correction of the plurality of incremental alignment corrections to a current frame of the plurality of frames; and
applying each additional incremental alignment correction in the plurality of incremental alignment corrections to a different respective frame from the plurality of frames.

22. The method of claim 17, wherein aligning the axis of the scene with the gravity direction in the real-world spatial frame comprises:
determining, based on at least one of the angular motion of the device and the linear motion of the device, that a motion of the device exceeds a threshold; and
based on the motion of the device exceeding the threshold, applying the plurality of incremental alignment corrections across a plurality of frames capturing the scene.

23. The method of claim 17, wherein dividing the alignment correction into the plurality of incremental alignment corrections comprises:
determining a difference between the one or more alignment parameters and one or more additional alignment parameters previously used to align the axis of the scene with the gravity direction in the real-world spatial frame; and
based on a determination that the difference between the one or more alignment parameters and the one or more additional alignment parameters exceeds a threshold, dividing the alignment correction into the plurality of incremental alignment corrections.

24. The method of claim 17, wherein the one or more alignment parameters describe a rotation of at least one of the scene and one or more virtual content items rendered in the scene from a current pose to a gravity-aligned pose, the gravity-aligned pose being aligned with the gravity direction in the real-world spatial frame.

25. The method of claim 17, further comprising:
generating a map of the scene, the map of the scene comprising a set of three-dimensional (3D) landmarks in the scene projected from the real-world spatial frame to frame coordinates; and
storing the map of the scene and the updated gravity vector associated with the scene.

26. The method of claim 25, wherein the map of the scene comprises a simultaneous localization and mapping (SLAM) map, the method further comprising:
initiating a new extended reality session associated with the scene;
based on the stored map of the scene and updated gravity vector, loading an initial map of the scene for the new extended reality session;
registering the stored map of the scene to the initial map of the scene; and
aligning, using the updated gravity vector, the registered map of the scene with the gravity direction in the real-world spatial frame.

27. The method of claim 17, further comprising:
generating SLAM maps of a plurality of scenes;
storing the SLAM maps and associated gravity vectors; and
based on a determination that the device has moved from a current scene associated with a first SLAM map of the SLAM maps to a different scene associated with a second SLAM map of the SLAM maps, initializing a gravity-aligned SLAM map using the second SLAM map and an associated gravity vector.

28. A non-transitory computer-readable medium having stored thereon instructions that, when executed by one or more processors, cause the one or more processors to:
receive, from one or more sensors associated with a device, inertial measurements and one or more frames of a scene;
determine, based on the one or more frames and the inertial measurements, an angular motion of the device, a linear motion of the device, and a gravity vector indicating a direction of a gravitational force interacting with the device, wherein the gravity vector is determined when the device is static;
determine, based on a determination that a motion of the device is below a threshold, an updated gravity vector indicating an updated direction of the gravitational force interacting with the device;
determine, based on the updated gravity vector, one or more alignment parameters for aligning an axis of the scene with a gravity direction in a real-world spatial frame, the gravity direction corresponding to the updated direction of the gravitational force interacting with the device, wherein the one or more alignment parameters are determined by configuring the one or more processors to:
determine that a magnitude of an alignment correction associated with the one or more alignment parameters exceeds a threshold; and
divide the alignment correction into a plurality of incremental alignment corrections; and
align, using the one or more alignment parameters, the axis of the scene with the gravity direction in the real-world spatial frame.

29. A apparatus comprising:
memory; and
one or more processors coupled to the memory, the one or more processors being configured to:
receive, from one or more sensors associated with the apparatus, inertial measurements and one or more frames of a scene;
determine a gravity vector indicating a direction of a gravitational force interacting with the apparatus, wherein the gravity vector is determined when the apparatus is static;
determine, based on a determination that a motion of the apparatus is below a threshold, an updated gravity vector indicating an updated direction of the gravitational force interacting with the apparatus;
determine, based on the updated gravity vector, one or more alignment parameters for aligning an axis of the scene with a gravity direction in a real-world spatial frame, the gravity direction corresponding to the updated direction of the gravitational force interacting with the apparatus, wherein the updated gravity vector is determined by performing L1 averaging of associated gravity vectors; and align, using the one or more alignment parameters, the axis of the scene with the gravity direction in the real-world spatial frame.

* * * * *